(12) United States Patent
Storti et al.

(10) Patent No.: US 8,401,264 B2
(45) Date of Patent: Mar. 19, 2013

(54) SOLID MODELING BASED ON VOLUMETRIC SCANS

(75) Inventors: Duane Storti, Seattle, WA (US); Mark Ganter, Edmonds, WA (US)

(73) Assignee: University of Washington, Seattle, WA (US)

( * ) Notice: Subject to any disclaimer, the term of this patent is extended or adjusted under 35 U.S.C. 154(b) by 919 days.

(21) Appl. No.: 12/433,555

(22) Filed: Apr. 30, 2009

(65) Prior Publication Data

US 2009/0244065 A1 Oct. 1, 2009

Related U.S. Application Data

(63) Continuation-in-part of application No. 11/608,750, filed on Dec. 8, 2006, now abandoned, and a continuation-in-part of application No. 11/941,863, filed on Nov. 16, 2007.

(60) Provisional application No. 60/748,947, filed on Dec. 8, 2005, provisional application No. 60/859,670, filed on Nov. 17, 2006.

(51) Int. Cl.
*G06K 9/00* (2006.01)
(52) U.S. Cl. ......... 382/131; 382/173; 345/419; 345/420
(58) Field of Classification Search .................. 382/131, 382/173; 345/419, 420
See application file for complete search history.

(56) References Cited

U.S. PATENT DOCUMENTS

| | | | | |
|---|---|---|---|---|
| 6,441,816 B1 * | 8/2002 | Nguyen et al. | ................. | 345/420 |
| 6,608,629 B2 * | 8/2003 | Perry et al. | ..................... | 345/619 |
| 6,718,054 B1 * | 4/2004 | Lorigo et al. | ................. | 382/128 |
| 2003/0001836 A1 * | 1/2003 | Ernst et al. | ..................... | 345/419 |
| 2004/0170302 A1 * | 9/2004 | Museth et al. | ................. | 382/107 |
| 2005/0152588 A1 * | 7/2005 | Yoshida et al. | ............... | 382/128 |

OTHER PUBLICATIONS

Chang, Jack, Mark Ganter, Duane Storti. "Interval Method for Interrogation of Implicit Solid Models", Proceedings of DETC '00, Baltimore, MD Sep. 10-13, 2000.

* cited by examiner

*Primary Examiner* — Chan S Park
*Assistant Examiner* — Eueng-Nan Yeh
(74) *Attorney, Agent, or Firm* — Christensen O'Connor Johnson Kindness PLLC

(57) ABSTRACT

The geometry of an object is inferred from values of the signed distance sampled on a uniform grid to efficiently model objects based on data derived from imaging technology that is now ubiquitous in medical diagnostics. Techniques for automated segmentation convert imaging intensity to a signed distance function (SDF), and a voxel structure imposes a uniform sampling grid. Essential properties of the SDF are used to construct upper and lower bounds on the allowed variation in signed distance in 1, 2, and 3 (or more) dimensions. The bounds are combined to produce interval-valued extensions of the SDF, including a tight global extension and more computationally efficient local bounds that provide useful criteria for root exclusion/isolation, enabling modeling of the objects and other applications.

42 Claims, 16 Drawing Sheets

SOLID MODELING BASED ON VOLUMETRIC SCANS

RELATED APPLICATIONS

This application is a continuation-in-part of a patent application, "Three Dimensional Modeling of Objects," Ser. No. 11/608,750, filed on Dec. 8, 2006 now abandoned, which is based on U.S. provisional patent application Ser. No. 60/748,947, filed on Dec. 8, 2005, and of a copending patent application, "Function Based Representations of N-Dimensional Structures," Ser. No. 11/941,863, filed on Nov. 16, 2007, which is based on U.S. provisional patent application Ser. No. 60/859,670, filed on Nov. 17, 2006, the benefit of the filing dates of which is hereby claimed under 35 U.S.C. §120 and 35 U.S.C. §119(e).

GOVERNMENT RIGHTS

This invention was made with government support under Grant #CMMI-0733831 awarded by The National Science Foundation. The government has certain rights in the invention.

BACKGROUND

In many different applications, the processes of modeling, design, and analysis often involve the simultaneous treatment of objects or artifacts (i.e., parts designed by humans) or anatomical structures. However, such objects can be represented in alternative ways. An inherent conflict arises in these different aspects of the problem because the geometric descriptions are completely different for these different approaches in representing objects. For example, artifact descriptions are typically produced as the output of computer-aided design (CAD) software and consist of a collection of parametric patches that comprise the boundary of the artifact. In contrast, the native description of an anatomical object or other scanned structure typically consists of an image stack produced using computed tomography (CT) or magnetic resonance imaging (MRI) in which the structure is evident as a result of the different intensities within regions of images in the image stack. The conventional approach for simultaneously dealing with both categories of entities involves working primarily in the world of CAD. The scanner data must be processed to determine segmentation (i.e., to decide which voxel in the scanner data belongs to each object of interest). The segmented results are then converted to traditional boundary representation (b-rep) CAD models. However, a CAD model can include such large numbers of parametric patches such as triangles (often on the order of $10^6$ or $10^7$ in number) that performing standard CAD operations on the model becomes problematic. Most traditional CAD systems are designed to deal with environments composed of at most, thousands of individual objects with tens of thousands of individual surfaces. Beyond these limits, the performance of many CAD systems is unacceptably slow. These concerns suggest that forcing the disparate aspects of this problem into a traditional CAD environment may not really be the best approach. While the CAD environment is acceptable for creating models of limited complexity, as the complexity of models increases, the CAD environment will become increasingly inefficient for this purpose. For example, the complexity of many anatomical structures will likely require that a different novel approach be developed for creating appropriate models that does not rely on the CAD environment. Thus, a desirable alternative approach might be to create a solid model from the volumetric image scanning data using a novel computationally efficient process.

There are many applications that might benefit from an efficient method of converting the data produced by volumetric scans of one or more objects or artifacts into solid models. However, a particular application, such as artificial joint replacement, merits special attention in this regard, because the benefits that might accrue from the use of such a method clearly justify further research in this area. According to the Healthcare Cost and Utilization Project that is operated by the U.S. Department of Heath and Human Services Agency for Healthcare Research and Quality, each year, more than 750,000 hip and knee replacement surgeries are performed at a cost that, by 2005, had already grown to almost 32 billion dollars. A significant fraction of the patients (i.e., 14% of knee replacement patients) must return for a second operation and adjustment procedure to modify their implants, at an annual total cost of about five billion dollars. This rate of unsuccessful first-time procedures is not a reflection of a lack of skilled surgeons, but is instead more the result of limitations of implant fit and placement. Significant amounts of healthcare money and patient discomfort could be saved if implants (and implant placement procedure plans) could be customized to each specific patient. And, as noted above, there are many non-medical applications for a technique that can use scan data to produce solid models. The solid models can then be employed in fabricating various types of objects, properly positioning objects relative to each other, and/or achieving a good fit between two or more objects that are coupled together.

Conventional solid modeling software typically employs boundary representations (b-reps) as the dominant paradigm, but there are cases in which b-rep models may not be the most efficient or effective format for this purpose. For example, models can be derived from voxelized intensity data obtained from various types of three-dimensional (3-D) scanners, such as those used for CT, MRI, and positron emission tomography (PET), using segmentation, i.e., determining the voxels in the scan data that belong to a specified object or structure. A number of different segmentation algorithms are available. While the segmented voxel set associated with an object provides a spatial decomposition model of a scanned object, the modeling range is limited to objects having boundaries that coincide with voxel boundaries. In particular, objects with curved surfaces cannot be accurately represented using this approach. Since many objects of interest, such as anatomical objects, have curved surfaces, an alternative to the b-rep solid modeling of objects is needed.

Attempts at improving the approximation of objects with curved surfaces typically involve polygonization of isosurfaces of associated scalar functions, including occupancy functions or signed distance functions (SDFs). Polygonized models span a broad modeling range, but they cannot faithfully represent objects with curved surfaces. Also, attempts at achieving an accurate approximation of curved surfaces can produce data having undesirably large file sizes. One conventional approach to producing models with smooth surfaces involves employing the segmentation results slice-by-slice, to produce surface curves that can be interpolated by splines, which are then lofted to produce smooth surfaces. Such an approach can be useful, but encounters complications when the number of connected components changes between slices. Accordingly, existing methods do not yet achieve a desired level of effectiveness.

However, it may be useful to follow the lead provided by polygonization methods. Specifically, it may be useful to invoke the existence of underlying scalar functions.

Polygonization methods strongly suggest the usefulness of implicit or function-based representations (f-reps). Yet, this approach is still relatively computationally intensive and does not provide the resolution that may be desired for creating solid models of some objects or artifacts.

With some human intervention, modern segmentation algorithms can convert the intensity data produced by volumetric scans to signed distance data that specifies the distance from the center of each voxel in the scan data to a boundary of an object being segmented. In this approach, a negative sign indicates an interior voxel within the object, and a positive sign an exterior voxel that is in the volume outside the object. Earlier work in this area has shown the advantage of using a graph cuts method to initially identify the voxels comprising scanner data that are part of an object or part of the background, i.e., to determine which points are inside an object and which are outside, and then using a level sets method to refine the voxel identification. The level sets method determines the SDF values that define a model of the object.

In the approach discussed above, the points labeled as inside and outside an object are retained. Wavelets (such as Daubechies wavelets) can be employed to interpolate known SDF values at the voxel centers in the scanned data to produce wavelet-SDF-rep models in which the wavelet interpolant provides the function that represents the segmented object. Since there are many possible choices of wavelets (even restricting the choices to Daubechies wavelets, since the genus of Daubechies wavelets can still be chosen), a grid of signed distance values does not uniquely determine the object, because the interpolant is not, in general, uniquely determined away from the voxel centers. However, even using the wavelet approach, the resolution and efficiency of the method are not as good as might be needed for producing high quality models of an object such as an anatomical skeletal component.

Accordingly, it would be desirable to develop a method for using the range of SDFs (and the associated range of implicit object geometries) associated with a uniform grid of specified sample values, like those derived from voxel data. This approach might be used to create interval extensions of the signed distance so that all SDFs associated with the sampling lie within the bounds of an interval extension. The interval extensions of SDFs should be usable in one, two, three, or more dimensions.

SUMMARY

Accordingly, an exemplary method is described for creating a model of an object from volumetric scan data produced by using a scanner to scan a region in which at least a portion of the object is disposed. The volumetric scan data is processed with a computing device to create a signed distance grid of points, where each point in the signed distance grid corresponds to a vertex of a volumetric cell in the volumetric scan data and is associated with a signed distance value specifying a distance from the point to a surface of the object. A sign (i.e., "+" or "−") of the signed distance value for each point indicates whether the point is interior or exterior to the object. A unit magnitude gradient is then applied to the signed distance values, to determine an interval signed distance function that models the object.

The method can further include the step of identifying a minimum sample value and a maximum sample value in the signed distance data at vertices of each volumetric cell, to determine local extensions that define local interval bounds for the signed distance function that models the object.

The method can also include the step of determining a difference in the signed distance value at pairs of points on the signed distance grid for which the signed distance value is known, to determine upper and lower local interval bounds for the signed distance value at other points or sets of points. The difference between the signed distance values of two points cannot exceed the distance between the points.

Another step of the method can provide for creating an interval octree representation by initially employing a coarse octree cube level of resolution for the region, and then successively subdividing coarser octree cubes into finer resolution octree cubes. The step of employing the coarse octree cube can include the step of employing an initial octree cube sized to encompass an entire region that was scanned to produce the volumetric scan data. Further, each octree cube can be classified, and a complete categorization of the octree cubes defines the octree cubes as full (inside the object), empty (outside the object), as well as octree cubes whose vertex values include opposite signs so the surface of the object definitely passes through the octree cube so that the octree cube is partially occupied (on), octree cubes with all positive vertex values but which may still include some portion of the solid, and octree cubes with all negative vertex values but which may still include a portion of the exterior volume that is outside the object. Subdivision to full resolution may not eradicate these last two categories. The interval signed distance function can be employed to determine bounds for each octree cube, to determine if more detail for the surface of the object can be determined by further subdividing the octree cube. Any octree cube not yet classified as full or empty and having an edge length that is equal to the sample spacing between points on the signed distance grid can be treated as possibly containing one or more portions of the surface of the object, and as being not sub-dividable into higher resolution octree cubes, since classification of the resulting smaller octree cubes based solely on the volumetric scanner data would produce unreliable results.

The step of processing the volumetric scan data with a computing device can include the step of segmenting the volumetric scan data to produce the signed distance grid of points and to determine the signed distance values specifying the distances from the points to the surface of the object.

The method can also include the step of employing wavelets to interpolate known signed distance values at the vertices of volumetric cells in the scanned data, to produce a wavelet-signed distance function-representation model in which an interpolant wavelet function provides signed distance values between the points of the signed distance grid.

The step of providing the volumetric scan data can include the step of providing an appropriate subset of the volumetric scan data with sufficient information to specify a zero level set, in which a surface of a functional representation object corresponds to all points where the value of the function is zero. The method can then further comprise the step of reconstructing a remainder of the volumetric scan data as a solution of an eikonal equation. Also, the step of providing the appropriate subset of the volumetric scan data can include the step of employing either a narrow-band representation of the volumetric scan data, a skeletal representation of the volumetric scan data, or a wavelet compressed representation of the volumetric scan data (i.e., a subset of the wavelet coefficients that are an alternative representation of the scan data).

The step of providing the appropriate subset of the volumetric scan data can include the step of including only signed distance values and points on the signed distance grid where a magnitude of the signed distance value is less than a predefined threshold, so that the appropriate subset of the volumetric scan data are for a narrow band that extends for a predefined distance on either side of the surface of the object. In this case, the surface of the object is defined by points where the signed distance value is equal to zero.

The step of providing the appropriate subset of the volumetric scan data can also comprise the step of including only signed distance values and points on the signed distance grid that are identified as skeletal (or medial). (It will be understood that as used herein, the terms "skeletal" and "medial" are synonymous, but arose independently.) In this case, the method can comprise the step of including a set of singular points on the signed distance grid that is disposed in the interior of the object. It should be noted, however, that the exoskeletal data that are associated with exterior signed distance singularities are also relevant and useful. In this instance, for the continuous case, each of the singular points is at a center of a maximal sphere that has multiple contact points where the maximal sphere grazes the surface of the object. In the discrete case, skeletal points are identified by determining if a magnitude of the gradient at a point differs from one by more than a threshold value.

The wavelet compressed model representation can be produced by performing a wavelet analysis using correlations of the signed distance values with a vector of scaling coefficients to produce lower resolution results, and with a vector of wavelet coefficients to produce higher resolution results. Approximate signed distance values for points of the signed distance grid can subsequently be recovered by applying a wavelet synthesis function to non-zero results of the wavelet compressed model.

If the object comprises a polyhedral object, the signed distance values for the polyhedral object can correspond to distances from any point on the signed distance grid to a plane comprising a portion of the surface of the object, or to a line associated with an edge of the object, or to a vertex of the object. In this case, the method can include the steps of retaining only positive or only negative values and squaring the values to produce data corresponding to a regular sampling of quadratic functions. Daubechies wavelets can be used in connection with the regions of the quadratic functions, to produce the wavelet compressed representation. In this case, the resulting high resolution coefficients are equal to zero unless a wavelet coefficient vector is applied across a Voronoi boundary comprising a region closest to a plane on the surface, an edge, or a vertex of the polyhedral object.

For either the narrow-band representation or the skeletal representation, when a plurality of objects is disposed in the region, the method can include the steps of determining a minimum of the signed distance values at corresponding points in the signed distance grid for each object. The minimum signed distance values can then be logically combined to determine a classification of the points for a combination of the plurality of objects (such as their union), as being internal, on a surface, or external to the combination.

If the object is two-dimensional, the method can include the steps of determining signed distance values of vertices of the two-dimensional object and then establishing a vertex of the two-dimensional object that has the smallest signed distance value as an origin of a local coordinate system. The two-dimensional object is next divided into triangles using a diagonal line that extends between the origin and a diagonally opposite vertex. Signed distance values are assigned for each other vertex of the two-dimensional object relative to the local coordinate system, and local bounds are established for a triangle of the two-dimensional object as a function of the signed distance value of the origin and a size of at least one side of the triangle. Corresponding appropriate steps can be taken for an object having more than two dimensions.

Another aspect of this novel approach is directed to a system that includes a display for visually viewing a model of an object, a memory in which volumetric scan data and machine readable and executable instructions are stored, and a processor coupled to the display and to the memory. The processor accesses the volumetric scan data and executes the machine readable and executable machine instructions to implement a plurality of functions that are generally consistent with the steps of the method discussed above.

This application specifically incorporates by reference the disclosures and drawings of each patent application and issued patent identified above as a related application.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

Figure 3A:
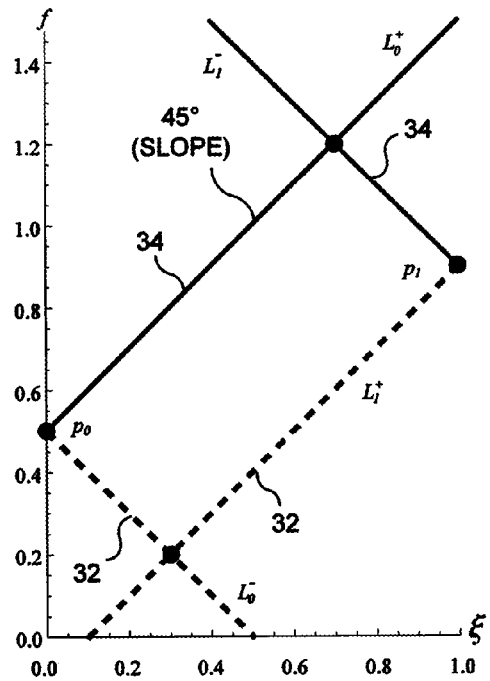
FIG. 3A is a graph illustrating the lower bounds (dash lines) and upper bounds (solid lines) generated by sample points $p_0$ and $p_1$.
Figure 3B:
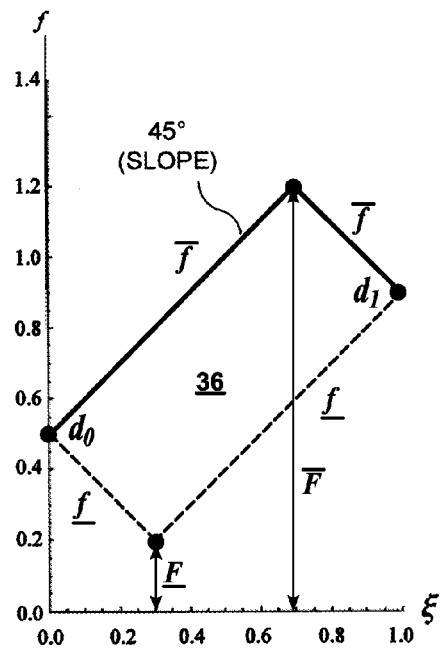
Figure 4A:
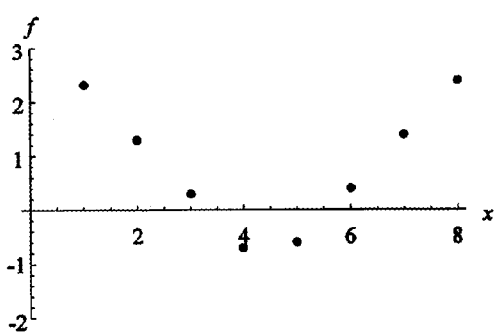
Figure 4B:
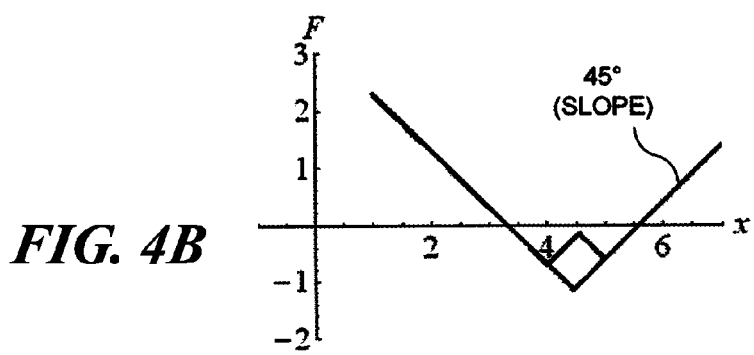
Figure 5A:
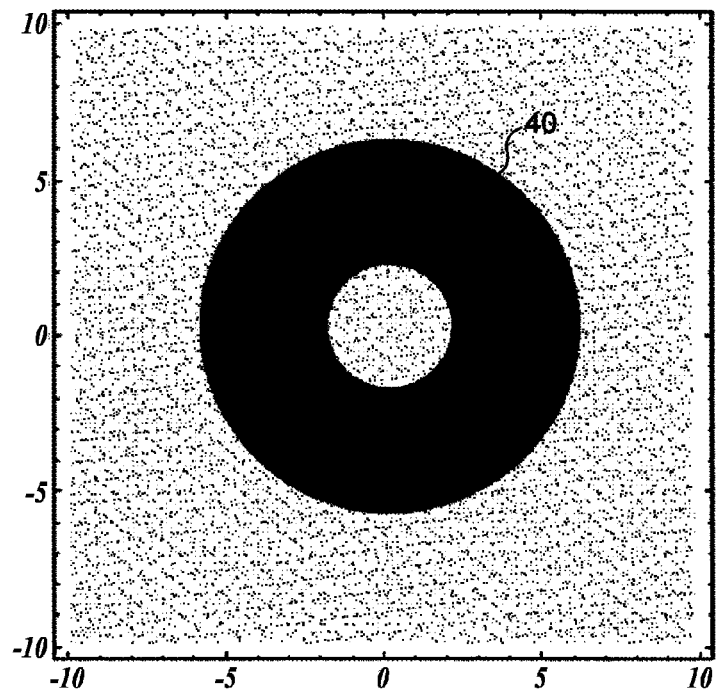
Figure 5B:
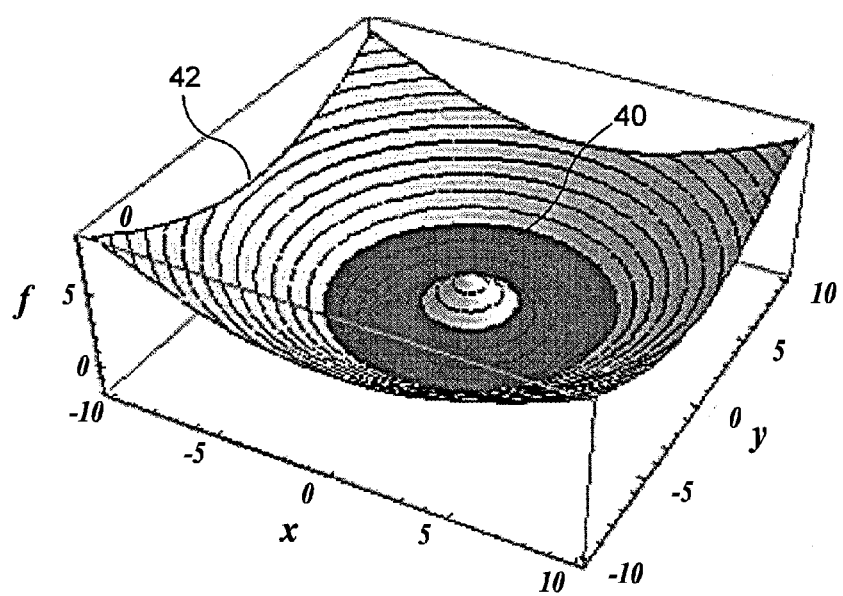
Figure 5C:
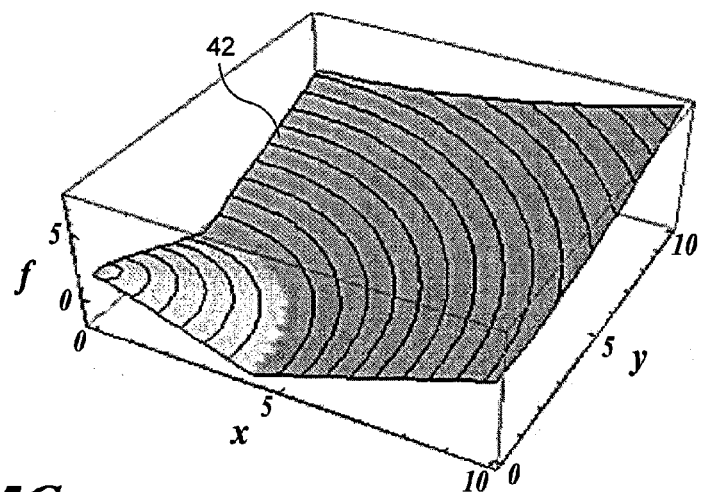
Figure 6A:
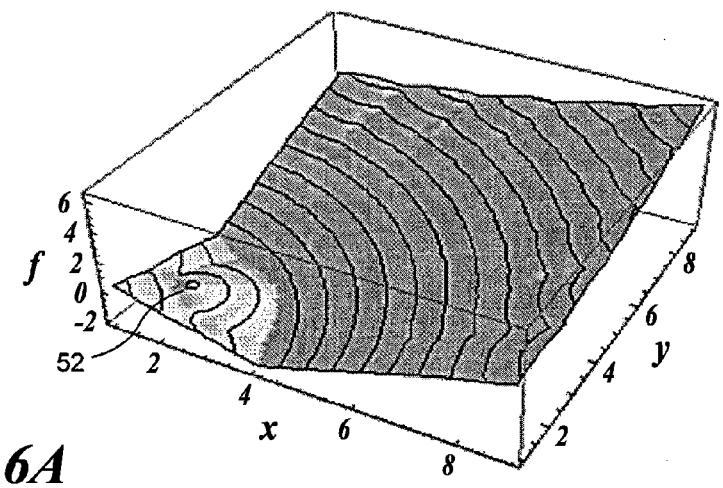
Figure 6B:
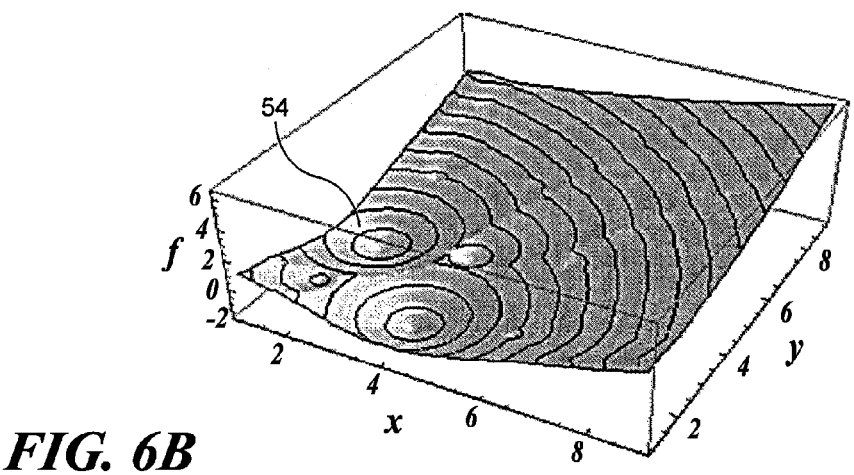
Figure 6C:
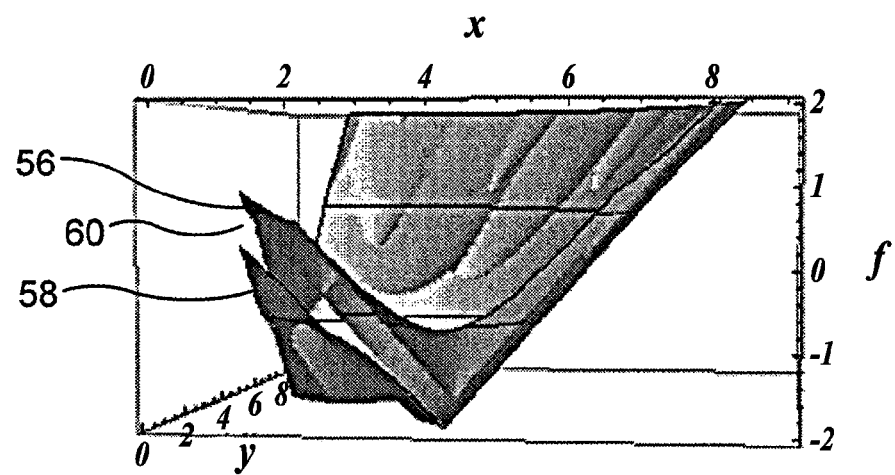
Figure 6D:
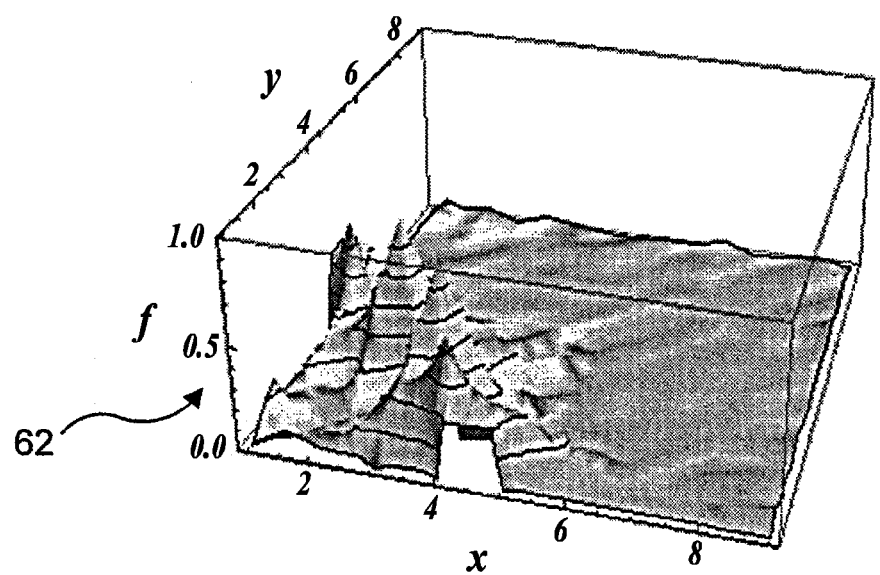
Figure 7A:
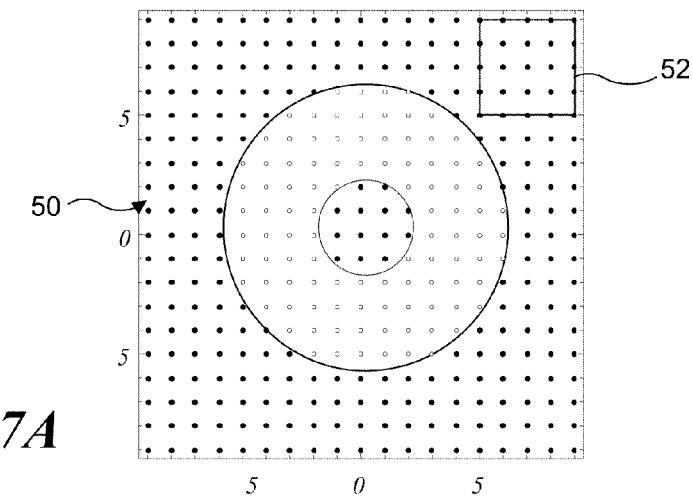
Figure 7B:
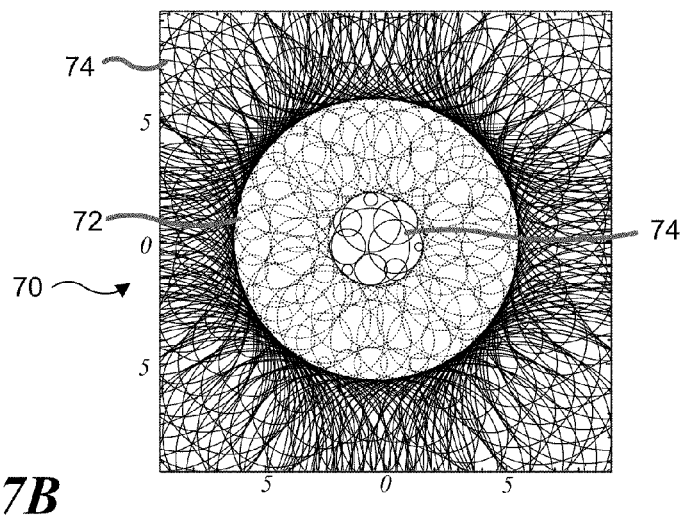
Figure 7C:
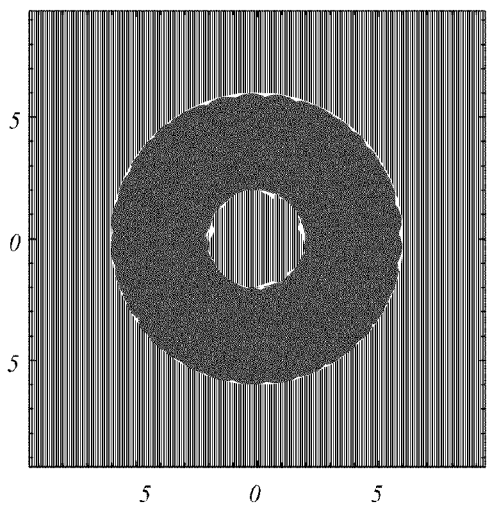
Figure 8A:
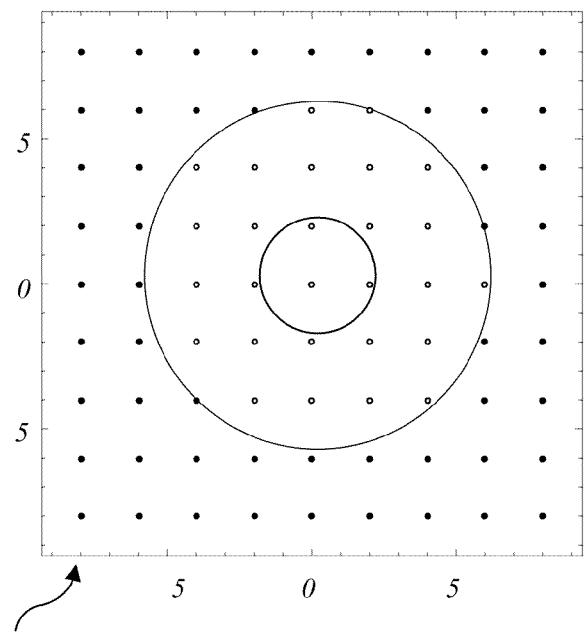
Figure 8B:
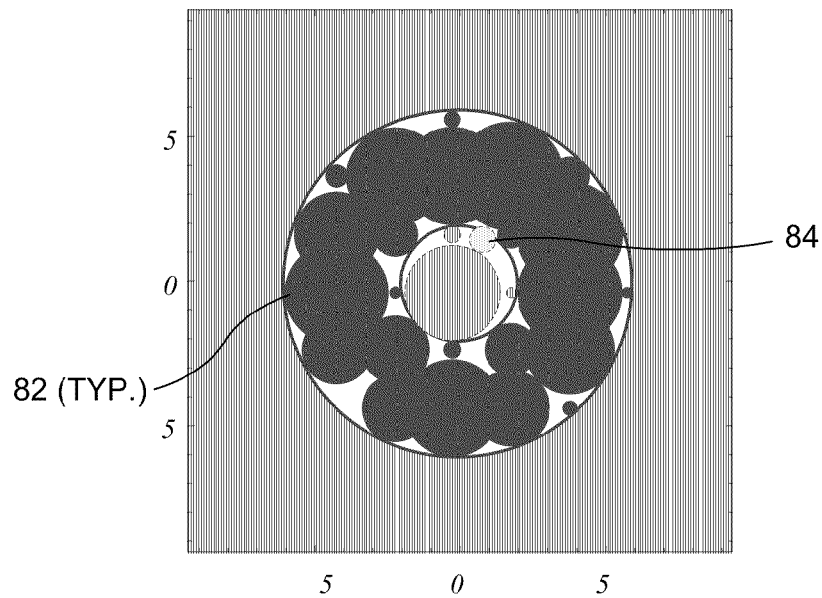
Figure 9:
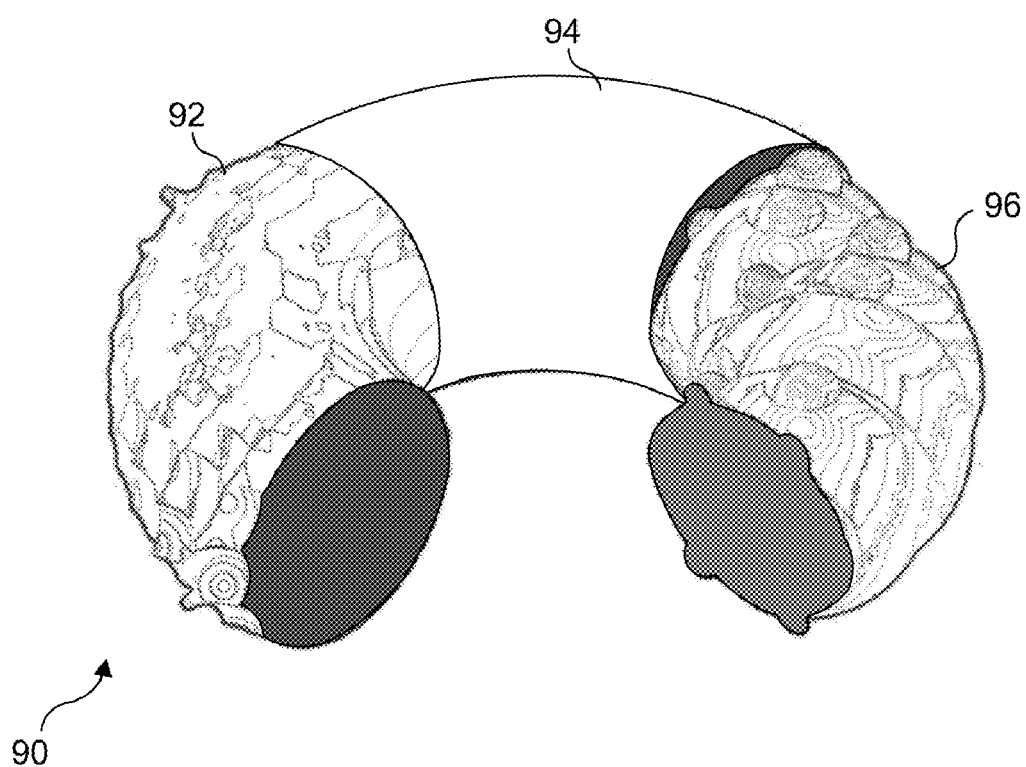
Figure 10A:
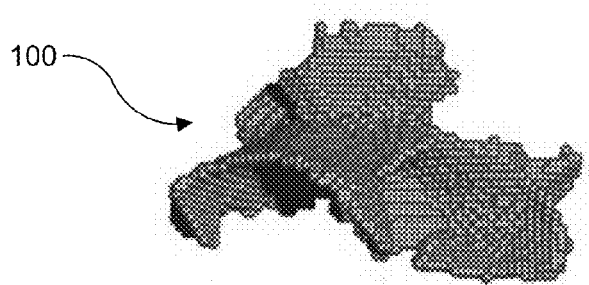
Figure 10B:
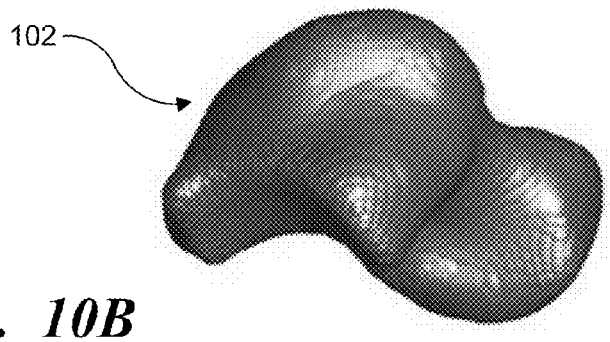
Figure 10C:
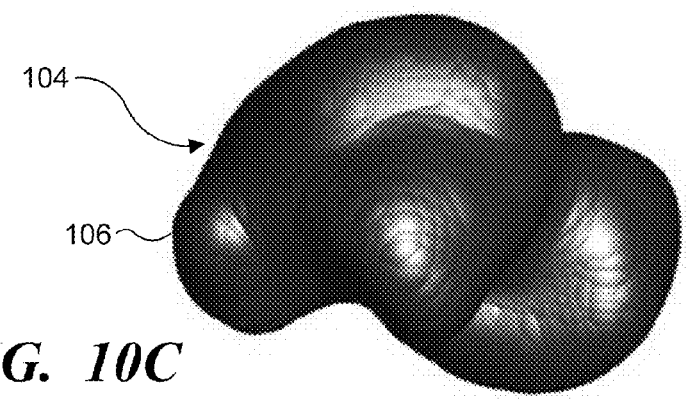
Figure 10D:
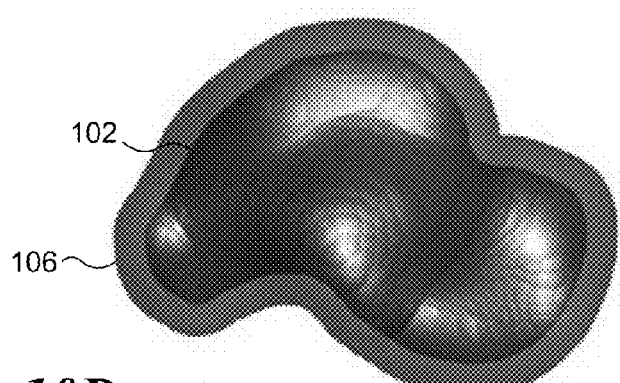
Figure 11:
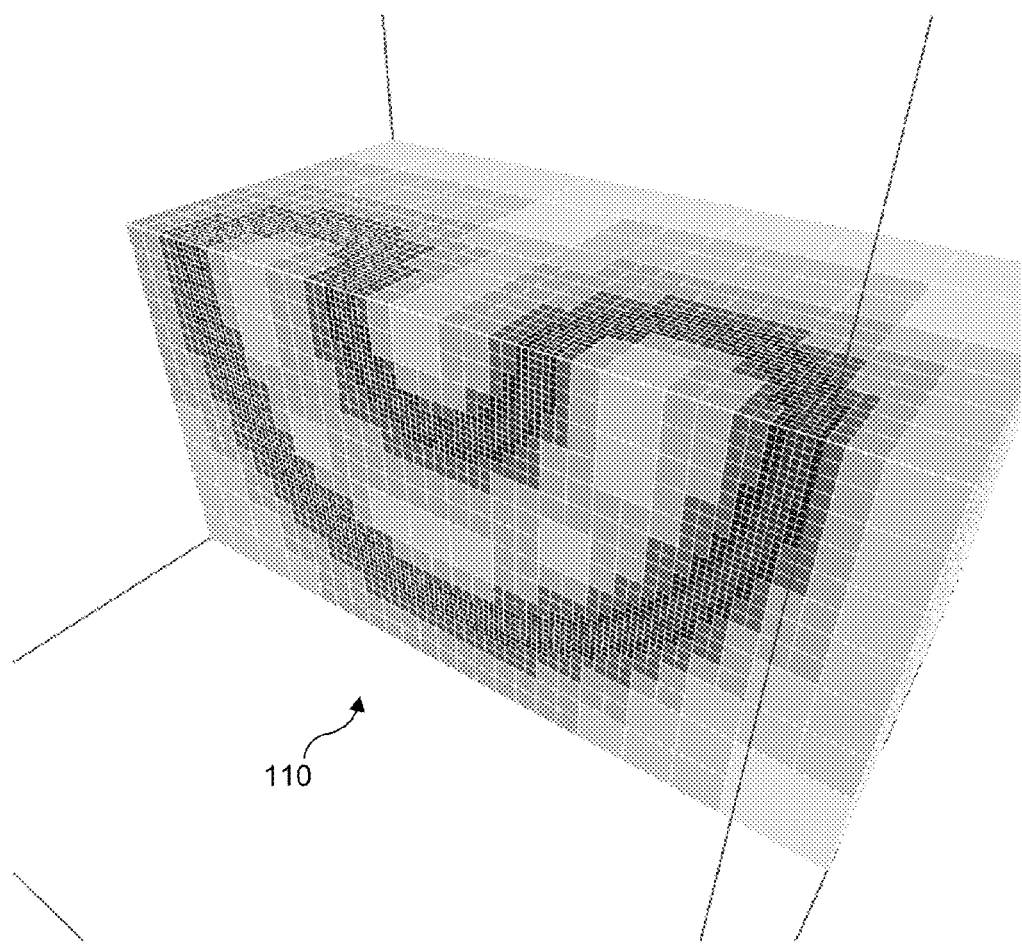
Figure 12:
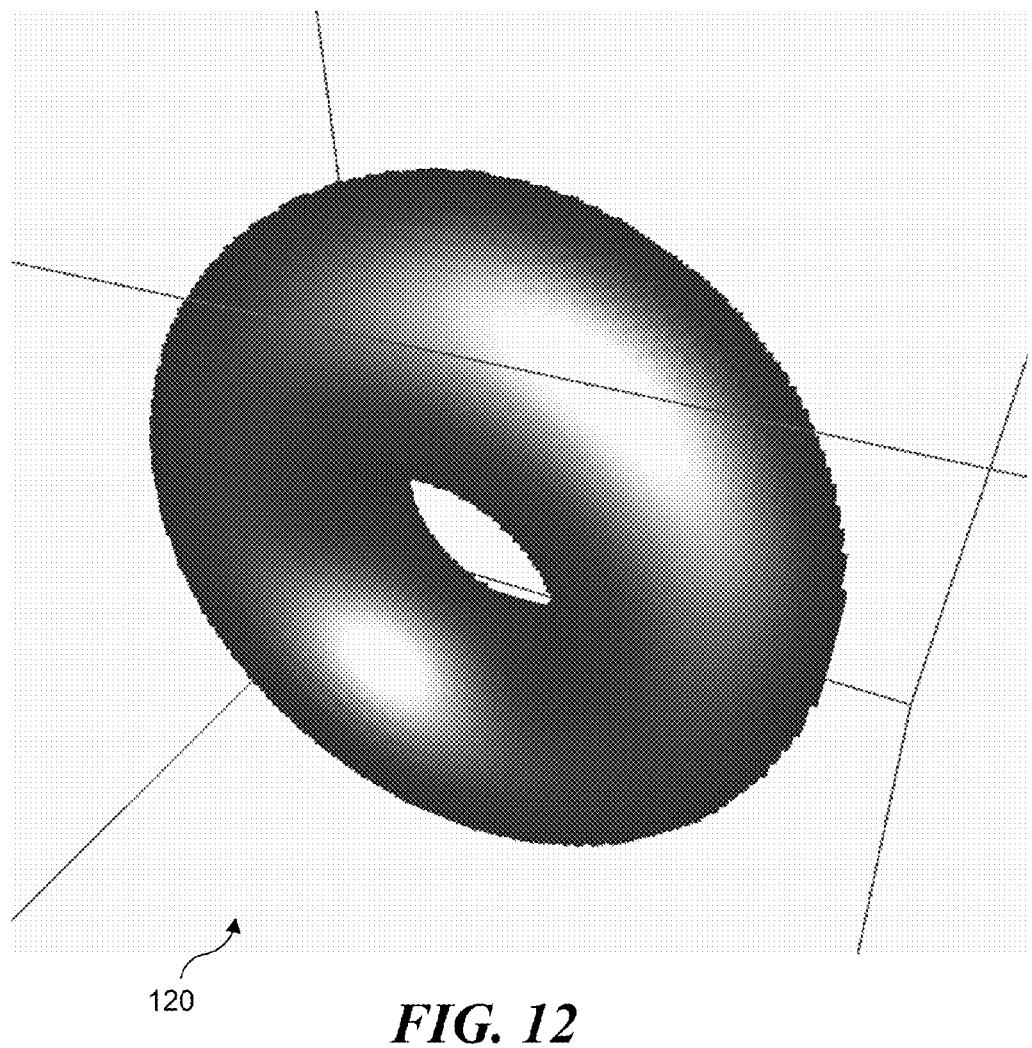
Figure 13:
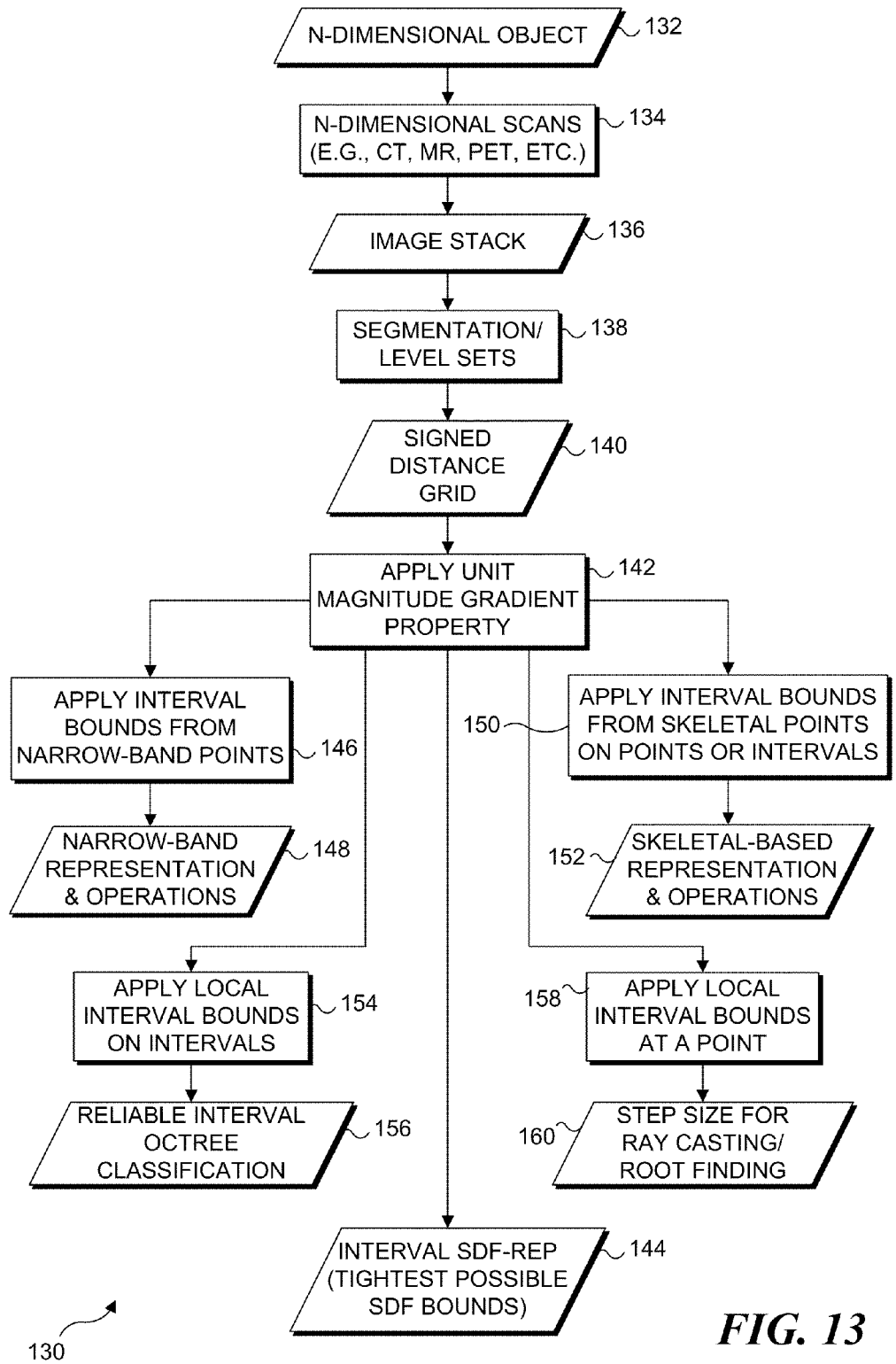
Figure 14:
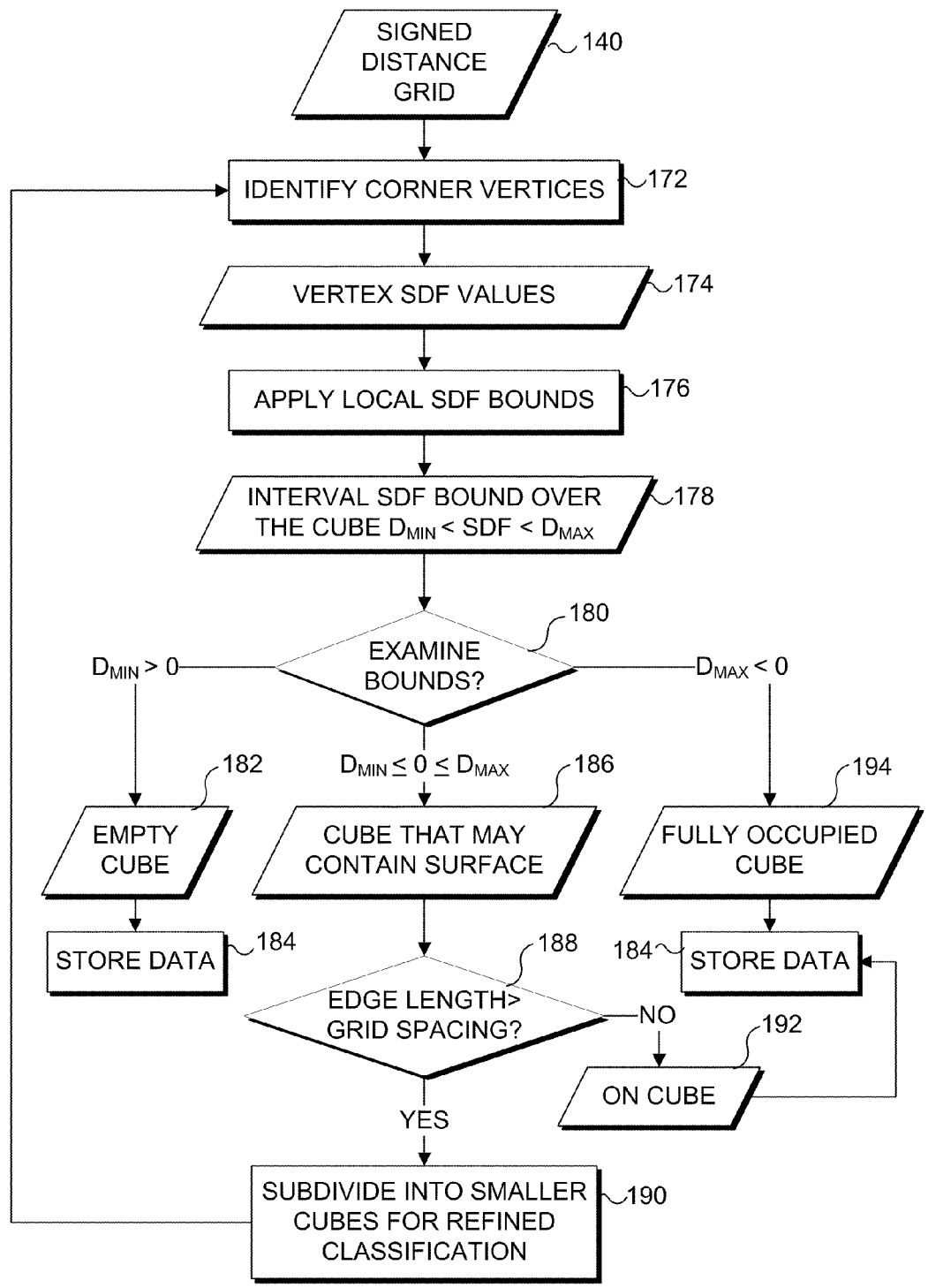
Figure 15:
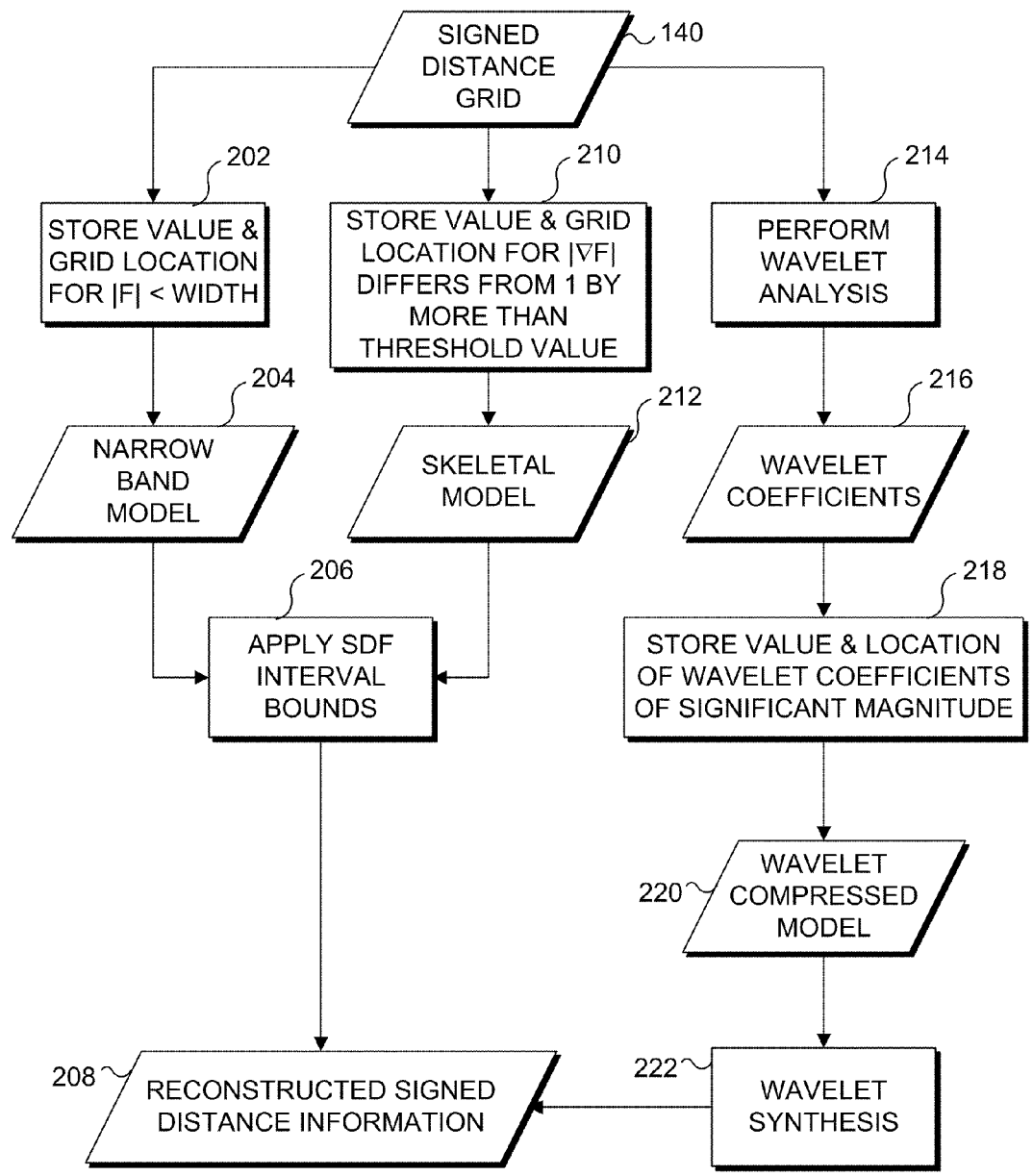
Figure 16:
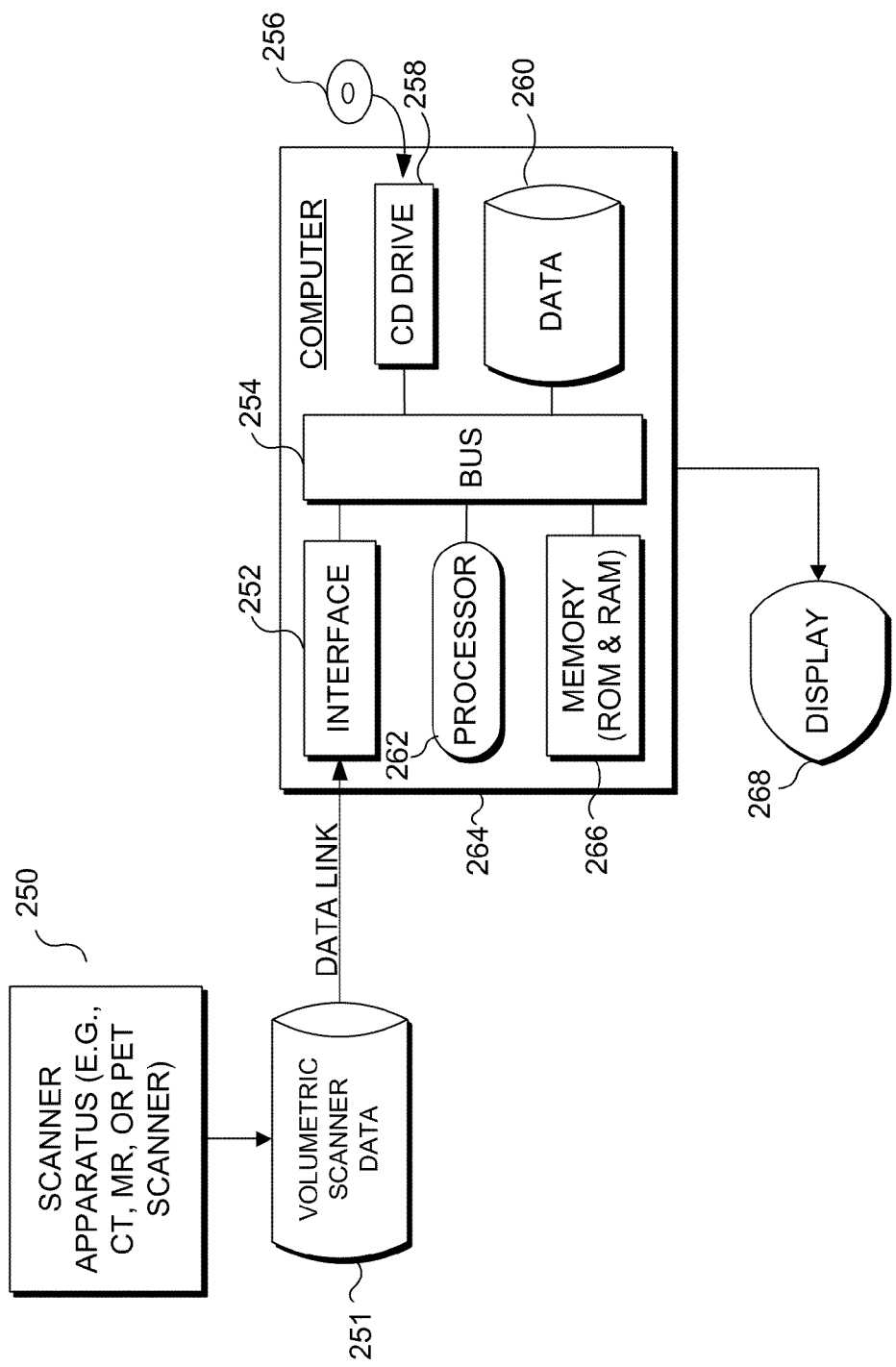

FIG. 3B is a graph illustrating the local interval extension of signed distance as a shaded region, wherein the bounds over the entire input interval are designated as $\underline{F}$ and $\overline{F}$, wherein: signed distance values $d_0=0.5$, $d_1=0.9$, and $\overline{\Delta}=1.0$, so that δ=0.4 (it being necessary that |δ|<Δ to produce nontrivial interval width), F=0.2, and $\overline{F}$=1.2;

FIG. 4A is a graph illustrating sample data from a 1-D SDF for the interval [3.3, 5.6] with Δ=1;

FIG. 4B is a graph based on FIG. 4A, illustrating an interval extension of the signed distance, wherein the implicit 1-D object is uniquely determined when the sample spacing is less than one-half the minimum feature size (in contrast to data from FIGS. 1A-1E where there is a feature smaller than 2 Δ, and the object is ambiguous);

FIG. 5A is a graph for a sample object defined by a SDF in two-dimensions, wherein an annulus is defined by 2<d({x, y},{0.2, 0.3})<6;

FIG. 5B is a graph wherein the annulus for the sample object of FIG. 5A is shown superposed on a plot of its distance function;

FIG. 5C is a graph for the sample object of FIGS. 5A and 5B, wherein the distance function is plotted over a first quadrant for comparison with the plot of FIGS. 6A and 6B;

FIG. 6A is a graph showing an interval extension for annulus sample data in regard to a global lower bound;

FIG. 6B is a graph showing an interval extension for annulus sample data in regard to a global upper bound;

FIG. 6C is a graph based on FIGS. 6A and 6B showing a detailed view of the lower and upper global bounds;

FIG. 6D is a graph showing an uncertainty in the signed distance (i.e., the width of an interval extension of the signed distance—noting that uncertainties are generally small except near a signed distance singular point that comprises the geometric skeleton (in this example, a circle with a center at 0.2, 0.3 and a radius equal to 4));

FIG. 7A is a graph showing an exemplary uniform sample grid;

FIG. 7B is a graph based on FIG. 7A that illustrates interior and exterior circles where bounding cones intersect the plane f=0;

FIG. 7C is a graph based on FIG. 7B, illustrating that the boundary of any implicit object generating the sample data lies in the gaps between interior and exterior regions;

FIG. 8A is a graph illustrating a sparser sampling of points for the annulus (compared to FIG. 7A);

FIG. 8B is a graph based on FIG. 8A illustrating interior and exterior circles associated with the sparser sampling points, wherein one circle (with dotted fill) lies within the intervening gap between the interior and exterior circles;

FIG. 9 graphically illustrates global bounds that are based on uniform sampling of a torus distance field, wherein an outer bound surface (shown at the left side of the Figure) is cut away to reveal the torus in the middle of the Figure, which is in turn cut away to reveal an inner bound surface (shown at the right of the Figure);

FIG. 10A is a graphical representation showing an exemplary compressed representation of a talus, which is a bone in the ankle, wherein approximately 5,000 discrete skeletal points are represented as small spheres;

FIG. 10B graphically illustrates the small spheres of FIG. 10A, with their correct radii corresponding to the magnitude of the signed distance;

FIG. 10C graphically illustrates the result of increasing the radius of the skeletal grid points of FIG. 10A to create a model of a new solid having an offset surface;

FIG. 10D graphically represents a translucent version of the new solid formed in FIG. 10C, superposed on the original discrete skeletal model of the talus;

FIG. 11 graphically illustrates the result of a guaranteed octree classification for a torus, wherein the interior and exterior cubes are shown in different shades of gray, and the darker gray cubes cannot be further classified because their edge length is equal to the sample spacing;

FIG. 12 is a graphical rendering of the torus boundary cubes wherein the shading is based on a wavelet derivative estimate of a surface normal;

FIG. 13 is a flowchart showing exemplary steps for carrying out the present novel approach;

FIG. 14 is a flowchart showing exemplary steps for applying SDF interval bounds to the signed distance value data on a signed distance grid, to determine spatial decomposition using the octree approach;

FIG. 15 is a flowchart showing exemplary steps for creating a sparse representation of signed distance value data for an object and reconstructing the full signed distance value data; and FIG. 16 is a functional block diagram of an exemplary system that is usable to implement the present novel approach.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein.

SDFs

The SDF is considered as a special case of an implicit object (or f-rep) in accord with the following definition. "A subset $O \subset \mathbb{R}^k$ (where $\mathbb{R}$ is the set of all real numbers) is called an implicit object if there exists a function $f: U \to \mathbb{R}^k$, $O \subset U$, and a subset $V \subset \mathbb{R}^k$, such that $O=f^{-1}(V)$. That is, $O=\{r \in U: f(r) \in V\}$." This definition is so general that any closed subset can be represented as an implicit object of a smooth function, so it is appropriate to apply further restrictions. In particular, choosing k=1 and V to be the non-positive real numbers produces a point membership classification function for o so that:

$$f(r) = \begin{cases} > 0, & r \in \text{Exterior}, \\ = 0, & r \in \text{Boundary}, \\ < 0, & r \in \text{Interior}. \end{cases} \quad (1)$$

Note that such representations are not unique, so there is flexibility to choose functions that are particularly well-behaved or useful. The information conveyed by the value of the function, and the extent of the domain with valid information are useful criteria for determining point membership classification. By choosing faithfulness to a metric of the ambient space as useful information, it appears that the optimal implicit function is the Euclidean distance from the surface $M=\partial O=f^{-1}(=f(0))$:

$$f(r) = \text{Min}[d(r, p_{skel}) - \rho(p_{skel})] \quad (2)$$

where $d(r, p_{skel})$ is the Euclidean distance from r to a point, $p_{skel}$, on the interior medial axis of M and $\rho(p_{skel})$ is the distance of $p_{skel}$ from M, and the minimum function is taken over the skeletal points. Thus, $f(r)$ produces the signed distance from the point r to its nearest point on the surface of the object. The SDF has unit magnitude gradient and satisfies the eikonal equation, $|\nabla f|=1$, except at its singular points, which lie on the medial axis or skeleton. Note that operations involving the surface of the object correspond mathematically to performing root-finding on the point-membership classification function $f$. For such purposes, SDFs are extremely well-behaved due to the unit bound on the gradient magnitude given by the eikonal equation.

Returning to the motivational problem of constructing models by segmenting voxelized intensity data, SDFs are relevant because segmentation methods based on level sets operate by computing discrete approximations of solutions to the eikonal equation. In other words, level set segmentation algorithms produce good approximations of the signed distance value on a regular grid of sample points, $r_{ijk}$, that can be viewed as lying at the center points of the voxels. Thus, segmentation produces a good starting point toward an implicit model, but it is necessary to specify distance values in the gaps between the grid points to complete the specification of the point membership classification function $f$.

Here, rather than specifying a particular choice of $f$, the alternative approach can be taken of specifying bounds that must be satisfied at a particular point r for any SDF that could produce the sample values. The mathematical description appropriate for this purpose involves interval-valued functions as described below.

Interval Arithmetic/Analysis

An interval is a subset of the set of real numbers $\mathbb{R}$ such that:

$$X = [\underline{x}, \overline{x}] = \{x | \underline{x} \le x \le \overline{x}, \underline{x}, \overline{x} \in \mathbb{R}\}$$

Wherein an underline indicates a lower bound of the interval, and an overline indicates an upper bound of the interval. (Direct products provide straightforward extension to higher dimensions.)

One of the fundamental ideas of interval analysis is to support robust computation (especially root isolation) by including all possible outcomes of an operation. Thus, associated with an operation with real inputs and real output, it is appropriate to try specifying an interval extension of the operator, which takes interval valued inputs and produces an output interval that reliably contains all possible real outputs produced with real inputs selected from the input intervals. An optimal interval extension would produce only feasible outputs of the real function, i.e.:

$$X \cdot Y = \{x \cdot y | x \in X, y \in Y\} \quad (4)$$

but any specification of an interval extension that includes this tightest interval bound constitutes a valid interval extension of the real function. The concept that the output interval must include all possible results choosing inputs from the input intervals can be re-phrased strictly as a statement about the interval-valued function, and the associated property is referred to as "inclusion monotonicity." An interval-valued function F of the interval-valued variables $X_1, X_2, \ldots, X_n$ is inclusion monotonic if:

$$\forall Y_i \subseteq X_i, i=1, \ldots, n \Rightarrow F(Y_1, Y_2, \ldots, Y_n) \subseteq F(X_1, X_2, \ldots, X_n). \quad (5)$$

Inclusion monotonicity is the essential property because it ensures that subdivision methods for root-isolation are guaranteed to converge in a finite number of steps. The basic interval arithmetic functions, their rational compositions, and natural interval extensions of all standard functions are inclusion monotonic.

Interval Extensions of Signed Distance

Now, consider the specific case of interval extensions of a SDF whose values are specified on a uniform Cartesian grid. Let the grid points be denoted as $$r_{ijk} = (x_0 + i\Delta, y_0 + j\Delta, z_0 + k\Delta) \quad (6)$$

where $\Delta$ is the distance between nearest neighbors, and an i,j,k index indicates the displacement along the x,y,z axes, respectively from an origin at $(x_0, y_0, z_0)$. A sampled value of the signed distance is denoted as $f(r_{ijk}) = f_{ijk}$ and the full array of sampled signed distance values is referred to as:

$$f = f_{ijk}; i=0, \ldots, n_1-1; j=0, \ldots n_2-1; k=0, \ldots, n_3-1 \quad (7)$$

for a sample array of size $n_1 \times n_{12} \times n_3$,

The property of SDFs that is fundamental to construction of interval extensions is the unit magnitude gradient property, i.e., the difference in signed distance value between any two points cannot exceed the distance between the points. The tightest bounds that can be obtained for the signed distance at a generic point x is then given by:

$$f(r) = [\max\{f_{ijk} - d(r, r_{ijk})\}, \min\{f_{ijk} + d(r, r_{ijk})\}] \quad (8)$$

where d again indicates the Euclidean distance between points, and the "min" and "max" operators refer to the choices for i,j,k. It may seem that having written the tightest bound would be sufficient to determine the optimal interval extension. However, that is not really the case, because evaluating this bounding interval at any point requires computing the distance to every point on the grid and that approach is NOT efficient. The endpoints of this interval extension are referred to herein as global bounds because every sample point can enter into the computation.

To obtain more practical expressions, the interval extensions based on local bounds are also considered. By connecting the sample points along the coordinate directions, a regular array of cells is obtained that provides a uniform partition of the ambient space. A local interval extension involves only the sampled distance values associated with the vertices of the cell containing the input point or a portion of the input interval on which the signed distance is evaluated.

It is best to begin by illustrating signed distance extensions in 1-D, where the ideas, resulting geometry, and graphical presentation are all easiest to visualize. The 1-D case is particularly simple because there is only one coordinate axis, so the gradient of the real SDF must not only have unit magnitude, but must also be aligned with that coordinate axis (excluding singular points where the gradient fails to exist). The geometry of implicit objects in 1-D consists of a collection of intervals, and the corresponding SDFs consist of linear segments with one endpoint on either side of the horizontal axis and a slope alternating between +1 and −1. Singular points where $f<0$ (and the slope changes from −1 to +1) belong to the skeleton or medial axis, and singular points where $f>0$ (and the slope changes from +1 to −1) belong to the exoskeleton or external medial axis.

Figure 1A:
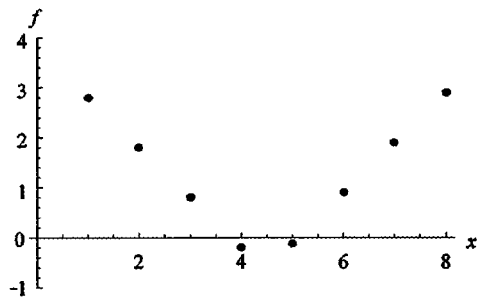
FIG. 1A is a graph illustrating exemplary one dimensional (1-D) signed distance sample values.
Figure 1B:
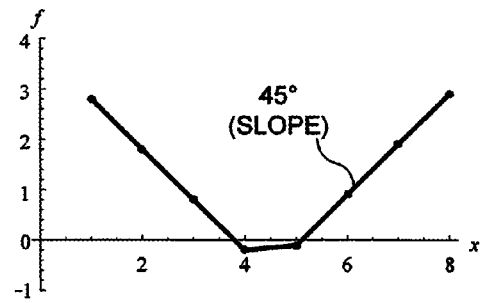
FIG. 1B is a graph based on FIG. 1A illustrating how simply connecting the sample values in FIG. 1A violates the unit gradient requirement.
Figure 1C:
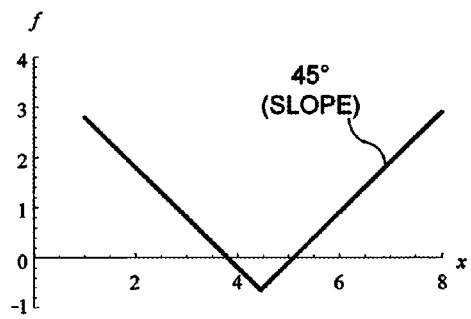
FIG. 1C is a graph also based on FIG. 1A illustrating how extending the lines produces a simplest valid candidate for signed distance and models the 1-D implicit object corresponding to 3.8<X<5.1.

FIG. 1A shows a feasible uniform sampling of a 1-D SDF. What can the corresponding SDF look like over the ambient continuous domain? The "connect the dots" result illustrated in FIG. 1B is not a valid candidate, because the unit gradient property is violated (i.e., because the slope $\ne \pm 1$) on 4<x<5. Based on the description given above for 1-D SDFs, it is tempting to posit that the signed distance over the ambient domain is obtained by "extending the lines" as shown in FIG. 1C. This approach is supported by an Occam's razor argument, because it produces the simplest function (i.e., has the minimal number of singular points and linear segments) and models the interval [3.8, 5.1]. "Extending the lines" also produces the simplest skeleton or medial axis consisting of the sole interior singular point at x=4.45.

Figure 1D:
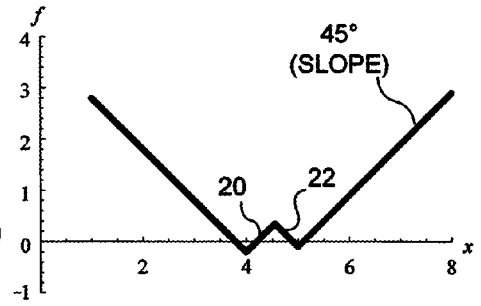
FIG. 1D is a graph based on FIG. 1A wherein a valid SDF models the union of intervals 3.8<X<4.2 and 4.9<X<5.1.
Figure 1E:
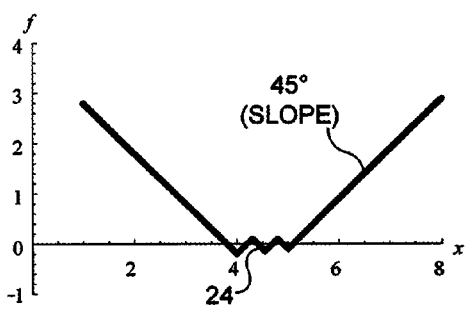
FIG. 1E is a graph based on FIG. 1A, extending the concept of FIG. 1D by modeling a union of three intervals that are derived from the same sample data.

Must the signed distance plot really look like FIG. 1C? The answer is negative, as can be demonstrated by the example shown in FIG. 1D, where two additional linear segments 20 and 22, and singular points occur, and the function models the union of two intervals: [3.8,4.2]∪[4.9,5.1]. The skeleton also becomes more complicated, consisting of the internal singular points at x=4.0 and x=5.0. An exterior singularity, or exoskeletal point, now exists at x=4.55. In the context of deriving models from scanner data, the result illustrated in FIG. 1D is problematic, because the model contains intervals whose size fall below the sample spacing. In fact, it is possible to produce models with an arbitrary number of intervals having no associated sample points. (FIG. 1E illustrates the next step in such a construction. Interpretations with arbitrarily fine detail can be obtained by introducing additional kinks 24 in the graph that produce new roots that are at a higher resolution than the scan sampling.) For the purposes of interpreting a finite resolution sampling of the defining function for an implicit object, the SDF illustrated in FIG. 1C is clearly the preferred choice, because it avoids including details that are not only at finer resolution than the sampling, but also independent of the sample data. However, there are many other possible SDFs that pass through the sampled data, so it is better to return to solving the problem of finding useful bounds on all possible SDFs associated with given sample data.

Global Bounds

The unit gradient property of the signed distance ensures that from any sample point, lines can be drawn with slope +1 and −1, and the graph of the signed distance must lie between these lines. Alternatively, these bounding lines can be thought of as a pair of wedges: one point-down on top of the sample point that provides an upper bound, and one point-up below the sample point that provides a lower bound. To obtain the upper bound at any point, the lowest of the upper bound wedges is used; and to obtain the lower bound at any point, the highest of the lower bound wedges is used. A data set can be tested to see if it legitimately corresponds to a SDF by evaluating the global bounds. If the global bound produces a null interval anywhere (i.e., if ∃x such that $\underline{f}(x) > \overline{f}(x)$), then the data set does not correspond to a signed distance data set.

Figure 2A:
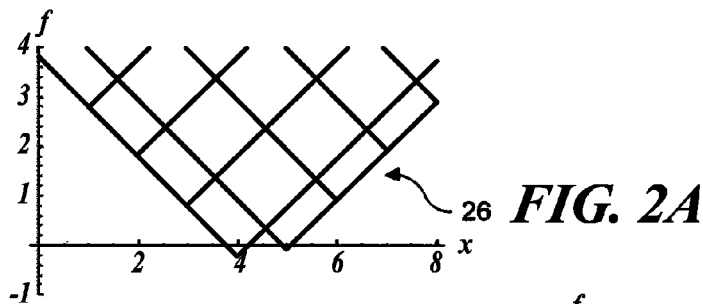
FIG. 2A is a graph based on FIG. 1A, illustrating 45° wedges above the sample data that provide upper bounds, i.e., the signed distance is excluded from the shaded regions shown.
Figure 2B:
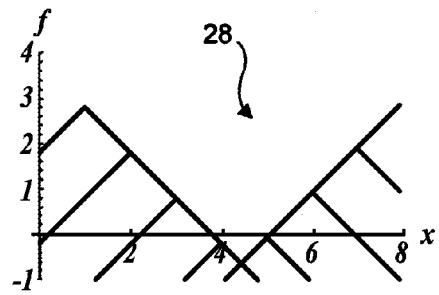
FIG. 2B is a graph based on FIG. 1A, illustrating 45° wedges below the sample data that provide lower bounds excluding signed distance from shaded regions.
Figure 2C:
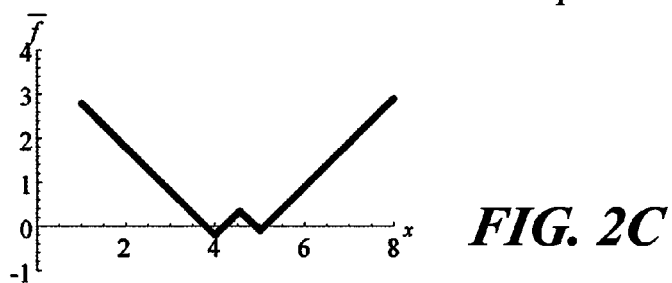
FIG. 2C is a graph illustrating that the minimum value from FIG. 2A provides a global upper bound.
Figure 2D:
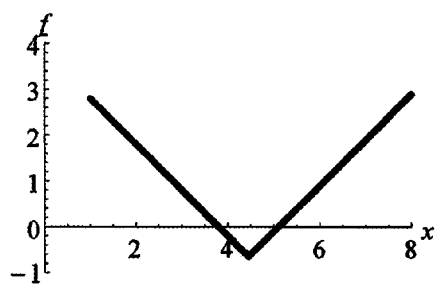
FIG. 2D is a graph illustrating that the maximum value from FIG. 2A provides a global lower bound.
Figure 2E:
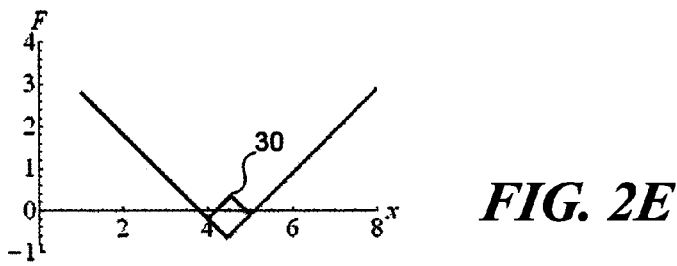
FIG. 2E is a graph illustrating that the upper bound of FIG. 2C and lower bound of FIG. 2D provide an interval extension of the signed distance, wherein the shaded region indicates allowed variation of signed distance corresponding to the sample data (of FIG. 1A)

Moving on from the above discussion about testing to ensure that a data set includes valid SDF data, it will be helpful to illustrate a global bound construction for the sample data from FIG. 1A. FIG. 2A shows the point-down wedges 26 atop each data point that provide upper bounds, and FIG. 2B shows the point-up wedges 28 that provide lower bounds. The salient feature is that these bounds are largely redundant, and this redundancy leads to a consideration of local bounds, as noted below. Before doing so, however, the construction of global bounds is completed. The global upper bound is given by the minimum of the upper bound wedges: $\overline{f} = \text{Min}(\overline{f}_1, \overline{f}_2, \ldots, \overline{f}_n)$. The global upper bound, $\overline{f}$, for the sample data is shown in FIG. 2C. The global lower bound given by the maximum of the lower bound wedges, $\underline{f} = \text{Max}(\underline{f}_1, \underline{f}_2, \ldots, \underline{f}_n)$, for the sample data, is shown in FIG. 2D. Finally, a global interval extension 30 of the signed distance, $F=[\underline{f},\overline{f}]$, is shown in FIG. 2E. Note that, except in an interval where a singular point exists, the interval size is trivial and the sample data precisely determine the signed distance.

Local Bounds

Prompted by the redundancy observed in the global bounds, it is relevant to consider a local bound construction. Specifically, the construction can be restricted to a domain consisting of a single 1-D cell between two sample points, and only the bounds provided by points at the vertices of the cell need be considered. To fix notation, let the width of the cell (or the effective sample spacing) be Δ and let the sample values at the left and right vertices be a and a+δ. Employing a local coordinate ξ measured from the left vertex, the plot of the signed distance must pass through the endpoints $p_0=\{0,a\}$ and $p_1=\{\Delta, a+\delta\}$. The only bounds relevant on the restricted domain of interest, 0<ξ<Δ, involve the right half of the wedges from $p_o$ and the left half of the wedges from $p_1$. Let $L_o^+$, $L_o^-$, $L_1^+$, and $L_1^-$ be the line segments from $p_o$ and $p_1$ with slopes ±1 in the restricted region of interest:

$$L_o^+ = \{(\xi,y) | y=a+\xi; 0 \leq \xi \leq \Delta\}$$

$$L_o^- = \{(\xi,y) | y=a-\xi; 0 \leq \xi \leq \Delta\}$$

$$L_1^+ = \{(\xi,y) | y=a+\delta+\xi-\Delta; 0 \leq \xi \leq \Delta\}$$

$$L_1^- = \{(\xi,y) | y=a+\delta-\xi+\Delta; 0 \leq \xi \leq \Delta\} \quad (9)$$

Collecting upper bounds ($L_o^+$ and $L_1^-$) and lower bounds ($L_o^-$ and $L_1^+$) yields:

$$\overline{f} = \text{Min}(a+\xi, a+\delta-\xi+\Delta)$$

$$\underline{f} = \text{Max}(a-\xi, a+\delta+\xi-\Delta) \quad (10)$$

The first fact worth noting is that the calculation can be restricted to the case where |δ|≤Δ. If |δ|>Δ, the magnitude of the change in the value of the function exceeds the distance between the sample points, which would violate the unit gradient property of the signed distance. (Graphically, the lower bound from one vertex exceeds the upper bound provided by the other vertex, $L_1^+$ lies above $L_o^+$ when δ>Δ or $L_o^-$ lies above $L_1^-$ when δ<−Δ, producing a null interval indicating invalid distance data.) For data taken from a sampling of a valid SDF, one of three cases can occur.

1. If δ=Δ, then the upper bound provided by $L_o^+$ is coincident with the lower bound provided by $L_1^-$ and the sample values at the vertices precisely specify that the SDF is the line segment with slope +1 connecting $p_o$ to $p_1$.

2. If δ=−Δ, then the upper bound provided by $L_1^+$ is coincident with the lower bound provided by $L_o^-$ and the sample values at the vertices precisely specify that the SDF is the line segment with slope −1 connecting $p_o$ to $p_1$.

3. The remaining case, −Δ<δ<Δ, is illustrated in FIG. 3A. FIG. 3A shows the lower bounds (dash lines 32) and upper bounds (solid lines 34) generated by neighboring sample points with distance values $d_o$ and $d_1$. The change in signed distance is $\delta = d_1 - d_o$ over the sample spacing Δ. At any point between the samples, the "active" bounds are those that are most restrictive (i.e., the larger of the lower bounds and the smaller of the upper bounds), leading to an interval extension of the signed distance illustrated in FIG. 3B. As the gap between samples is traversed, evaluation of the interval signed distance produces an interval 36 whose half-width increases linearly to $$\frac{1}{2}(\Delta - |\delta|),$$

remains constant (over distance Δ−|δ|), and then decreases linearly to become zero again at the other vertex. Evaluation of the interval signed distance over the entire cell as an input interval produces the output interval $F([x_o, x_o+\Delta]) = [\underline{F},\overline{F}]$ where:

$$\underline{F} = \min(d_o, d_1) - \frac{1}{2}(\Delta - |\delta|) \quad (11)$$

$$= \frac{1}{2}(d_o + d_1) - \frac{1}{2}\Delta$$

-continued $$\overline{F} = \max(d_o, d_1) + \frac{1}{2}(\Delta - |\delta|)$$

$$= \frac{1}{2}(d_o + d_1) + \frac{1}{2}\Delta$$

$$= \underline{F} + \Delta.$$

Recall that for distance values sampled from a segment of a ±45° line, $|\delta|=\Delta$, the output interval width is zero at any point in the interval, and the bounds over the input interval of width $\Delta$ are given by $[\underline{F},\overline{F}]=[\min(d_o,d_1), \max(d_o,d_1)]$.

Finally, note that the SDF describing an interval of width w attains a minimum value of $$-\frac{1}{2}w$$

at the midpoint of the internal. This minimum value also coincides with the lower bound of the interval extension of the signed distance, i.e.

$$\underline{E} = -\frac{1}{2}w,$$

since the lower bound produces the exact "V" shape of the signed distance for an interior interval. To ensure that the sample values uniquely represent an interval (and not an ambiguous collection of intervals as illustrated in FIG. 1A), it is necessary to ensure that the upper bound across the interval remains negative, i.e., $$\overline{F} = \underline{E} + \Delta = -\frac{1}{2}w + \Delta < 0,$$

as illustrated in FIGS. 4A and 4B. While the data may look similar to the data of FIGS. 1A-1E and FIGS. 2A-2E, the values are actually decreased sufficiently to ensure that the bounding interval in FIG. 2B prevents internal roots, in contrast to the interval in FIG. 2E that spans the horizontal axis. (A similar result is obtained for exterior intervals by reversing signs and exchanging $\underline{F}$ and $\overline{F}$.) This analysis of bounds supports the following theorems that specify the effectiveness of uniformly sampled signed distance values for modeling 1-D objects and for isolating roots of the continuous SDF.

1-D Sampled Signed Distance Representation Theorem: A collection of 1-D intervals with minimum feature length w is uniquely determined by a uniform sampling of the associated SDF with sample spacing $\Delta$ provided that $$\Delta < \frac{1}{2}w.$$

1-D sampled Signed Distance Root Exclusion Theorem: Let $f(x)$ be a SDF with $f(x_0)=d_0$ and $f(x_0+\Delta)=d_1$, then $f(x)$ has no root on $x_0<x<x_0+\Delta$ if $|d_0-d_1|>\Delta$.

Interval Signed Distance in Two Dimensions

In regard to the two-dimensional (2-D) case, the ideas remain the same as for the 1-D case, but the geometry becomes more complicated. The sample points now lie on a uniform 2-D grid so that the cells obtained by connecting neighboring sample points along the coordinate directions become squares; plots of the upper and lower bounds generated by each sample point become 45° cones with vertical axes of symmetry; and most significantly, the direction of $\nabla f$ can lie anywhere in the plane and need not be aligned with a coordinate direction.

Once again, the global bounds provided by the entire set of sample data can be written as $F=[\underline{f},\overline{f}]$, where:

$$\underline{f} = \underset{i,j}{\text{Max}}(\underline{f_{ij}}),$$  (12)

and $$\overline{f} = \underset{i,j}{\text{Min}}(\overline{f_{ij}})$$

$$\underline{f_{ij}} = d_{ij} - d(\{x, y\}, r_{ij}),$$

and $$\overline{f_{ij}} = d_{ij} + d(\{x, y\}, r_{ij}).$$

The global bounds and interval width for a sample 2-D object are illustrated in FIGS. 5A-5C and FIGS. 6A-6D. FIG. 5A shows an annulus 40 as limited in accord with $2<d(\{x, y\}, \{0.2,0.3\})<6$, which is also shown superposed on a plot of its distance function 42 in FIG. 5B. The plot of the distance function over the first quadrant is shown in FIG. 5C for comparison with the bounds illustrated in FIGS. 6A-6D based on the values at the sample points 50 shown in FIG. 7A. The global lower bound (comprised of portions of point-up cones 52) and upper bound (comprised of portions of point-down cones 54) over the first quadrant are shown in FIGS. 6A and 6B, respectively. FIG. 6C shows a magnified view of upper bounds 56 and lower bounds 58 plotted together to illustrate that there is a gap 60 between the bounds, and that the gap size is, in general, non-trivial between the sample points. The plot of any distance function that would generate the sample points must lie in the gap (in order to satisfy the upper and lower bounds), so FIG. 6C can be thought of as a plot of an interval valued extension of the signed distance generated by the sample points. FIG. 6D shows a difference 62 between the global bounds, which corresponds with the interval width for the global extension of the signed distance. The (generally) non-zero interval width indicates that the SDF is not typically completely determined by the sample values over large portions of the continuous domain (in contrast to the 1-D case). As a result, a very direct analog of the 1-D unique representation result is not supported in the 2-D case. However, it is clear that the width of the signed distance interval is small compared to the sample spacing except at sample points near singular points of the signed distance, which comprise the geometric skeleton. (The skeleton of the annulus is a circle with center at $\{0.2, 0.3\}$ and a radius 4.)

The generally small value of the interval width is an encouraging sign in support of accurate models from uniform discrete samplings, and it is thus possible to reach the following conclusions about point membership classification and root exclusion. For each interior sample point, $r_{ij}^-$, the upper bound cone intersects the $f=0$ plane in a contact circle (because it contacts the boundary M) of radius $\rho_{ij}=|f(r_{ij}^-)|$, and every point in that circle must be an interior point (because they are not far enough from $r_{ij}^-$ to have non-negative signed distance values). Similarly, the lower bound cone for each exterior point, $r_{ij}^+$, intersects the $f=0$ plane in a circle of radius $\rho_{ij}=|f(r_{ij}^+)|$, and every point in that circle must be an exterior point. FIG. 7B illustrates relevant contact circles 70 generated by sampling the signed distance for the annulus illustrated in FIG. 5A on the uniform 2-D grid of FIG. 7A. From the sampled signed distance data, it is not possible to exactly infer the shape of the object, but it is apparent that the boundary of the object must contain interior circles 72 and exclude exterior circles 74. The union of the lower (resp. upper) bound circles provides a geometric inner (resp. outer) bound for the boundary M of the implicit object. In FIG. 7C, the boundary must lie in the unshaded interstitial region between the interior (solid colored region) and exterior (lined region), and it is apparent that little "wiggle room" is available even with a sampling that is far from dense.

To examine sampling effects, reconsider the annulus with the sample spacing $\Delta=2$, and the results of the global bounds (including all contact circles) are shown in FIGS. 8A and 8B. Sample points 80 are shown in FIG. 8A, and FIG. 8B shows contact circles 82 where the bounding cones intersect the plane $f=0$. It is immediately apparent that the less dense sampling leaves considerably greater freedom for boundary variation, than the sampling in FIGS. 7A-7C. To demonstrate this point, FIG. 8B also includes a circle 84 (filled with dots) that lies in the unshaded region between the interior and exterior circles. Based on the prominent role of contact circles that is apparent from the figures, it is appropriate to employ the minimal value of the skeletal radius (including internal and external skeletal points) as a measure of feature size and to expect the shape to be well-specified by the sampling except near surface points associated with skeletal radius values smaller than the sample spacing.

While the discussion of the 2-D case has been based on the global bounds, it is important to recall that such bounds involve all of the sample points and computation of such quantities will be costly for large data sets. Moreover, the dependence of computational cost on sample spacing becomes more sensitive as the dimension of the space increases. So, motivated by computational efficiency, again consider local bounds that now apply over a square cell and involve the cones generated at its four vertices. The tightest local bound on the 2-D cell with vertices $\{x_o, y_o\}$, $\{x_o+\Delta, y_o\}$, $\{x_o, y_o+\Delta\}$, $\{x_o+\Delta, y_o+\Delta\}$ and associated sampled signed distance values $d_{00}, d_{10}, d_{01}, d_{11}$ is obtained, as before, by taking the maximum of the lower bounds and the minimum of the upper bounds giving:

$F([x_o, x_o+\Delta] \times [y_o, y_o+\Delta]) = [\underline{F}, \overline{F}]$ where:

$\overline{F} = \text{Min}(d_{00} + d(\{x,y\}, \{x_o, y_o\})$, $d_{10} + d(\{x,y\}, \{x_o+\Delta, y_o\})$, $d_{01} + d(\{x,y\}, \{x_o, y_o+\Delta\})$, $d_{11} + d(\{x,y\}, \{x_o+\Delta, y_o+\Delta\})$ $|\{x,y\} \in [x_o, x_o+\Delta] \times [y_o, y_o+\Delta]$  (12)

$\underline{F} = \text{Max}(d_{00} - d(\{x,y\}, \{x_o, y_o\})$, $d_{10} - d(\{x,y\}, \{x_o+\Delta, y_o\})$ $d_{01} - d(\{x,y\}, \{x_o, y_o+\Delta\})$, $d_{11} - d(\{x,y\}, \{x_o+\Delta, y_o+\Delta\})$ $|\{x,y\} \in [x_o, x_o+\Delta] \times [y_o, y_{o+\Delta}]$  (13)

Once again, this tightest bound is theoretically sound but it is possible to produce looser bounds that are more efficient to compute. A single point bound is obtained by examining only the extrema, $d_{min}$ and $d_{max}$, of the sample values at the vertices. The greatest change in value possible across the square cell is given by the diagonal. Thus, a single vertex 2-D interval extension of signed distance, $F_1$ is given by:

$$F_1 = [d_{max} - \sqrt{2} \cdot \Delta, d_{min} + \sqrt{2} \cdot \Delta]. \quad (14)$$

An alternative extension is obtained by considering all four vertices in the worst-case scenario, namely when all four sample values are equal, and the bounding cones provide maximum freedom for changes in signed distance. (Alternatively, note that decreasing/increasing a vertex value lowers/raises its cone and decreases/increases the minimum/maximum allowed value, providing looser, but reliable, bounds.) The bound resulting from considering equal vertex values produces $F_{iso}$, the isovalue 2-D interval extension of signed distance, as follows:

$$F_{iso} = \left[ d_{min} - \frac{1}{2}\sqrt{2} \cdot \Delta, d_{max} + \frac{1}{2}\sqrt{2} \cdot \Delta \right]. \quad (15)$$

Note that these simplified local bounds need not be employed at full sampling resolution. They can also be applied over larger regions based on the corresponding sample values and edge length. For example, a square 52 of size four in the upper right corner of FIG. 7A can be considered as a whole based on its vertex values $\{0.718, 3.94, 3.98, 6.37\}$ and side length $\Delta=4$. Applying local extensions yields:

$$F_{iso} = [0.72 - 2\sqrt{2}, 6.37 + 2\sqrt{2}] = [-2.11, 9.20] \quad (16)$$

$$F_1 = [6.37 - 4\sqrt{2}, 0.72 + 4\sqrt{2}] = [0.71, 6.38]. \quad (17)$$

While the isovalue extension admits roots on this square (since $0 \in [-2.11, 9.20]$), the single vertex extension precludes the existence of roots (since $0 \notin [0.71, 6.38]$) and immediately classifies the entire square as exterior. Alternatively, the bounds may be employed together to produce the intersection of their output intervals:

$$F_\cap = \begin{bmatrix} \text{Max}\left(d_{min} - \frac{1}{2}\sqrt{2} \cdot \Delta, d_{max} - \sqrt{2} \cdot \Delta\right), \\ \text{Min}\left(d_{max} + \frac{1}{2}\sqrt{2} \cdot \Delta, d_{min} + \sqrt{2} \cdot \Delta\right) \end{bmatrix}. \quad (18)$$

Interval Signed Distance in 3 Dimensions

Extending to the three-dimensional (3-D) case, the geometry again becomes a bit more complicated, since plotting the upper and lower bounds generated by each sample point now produces hypercones. However, the underlying concepts remain the same. The tightest possible global extension, $F = [\underline{f}, \overline{f}]$, considers the hypercones from the entire 3-D array of sample points, so that:

$$\underline{f} = \text{Max}_{i,j,k}(\underline{f_{ijk}}), \underline{f_{ijk}} \quad (19)$$

$$= d_{ijk} - d(\{x, y, z\}, r_{ijk})$$

$$\overline{f} = \text{Min}_{i,j,k}(\overline{f_{ijk}}), \overline{f_{ijk}} \quad (20)$$

$$= d_{ijk} + d(\{x, y, z\}, r_{ijk})$$

The hypercones intersect $f=0$ in contact spheres of radius $\rho_{ijk} = |d_{ijk}|$ whose interior points have a common point membership classification (interior or exterior), and their unions provide inner and outer bounds for the boundary M of the implicit object. FIG. 9 illustrates global bounds in 3-D. The sample object is a torus 90 with major radius a=3 and minor radius b=3/2, and distance function:

$$f_{torus} = \sqrt{z^2 + \left(\sqrt{x^2 + y^2} - a\right)^2} - b, \quad (21)$$

which is sampled with spacing $\Delta=1$ on a cube specified by: $-5<x<5$, $-5<y<5$, and $-5<z<5$. A portion 92 of the outer bound surface (associated with the upper bound hypercones and comprising portions of the exterior contact spheres) is shown on the left side of the Figure. The outer bound is cut away to reveal a portion 94 of the solid torus shown in middle portion of the Figure. This solid portion of the torus is then cut away to reveal a portion 96 of the inner bound surface (associated with the lower bound hypercones and comprising portions of the interior contact spheres), shown on the right side of the Figure. It will be apparent that the surface of the torus does lie, as required, in the interstitial space disposed between the inner geometric bound and outer geometric bound; and that even with this fairly sparse volumetric sampling, the contact points from just the exterior spheres provide a sufficiently dense sampling of the surface so that the outer bound surface provides a very close approximation of the shape of the torus. The occasional "spiky" outward protrusion of outer bound surface 92 (shown on the left) can only correspond to significant features if very small feature sizes are allowed (since the width of even the largest spike is considerably smaller that the sample spacing). The interior is so sparsely sampled that there are obvious gaps between inner bound surface 96 and surface 94 of the torus, and the existence of these gaps would allow for the possibility of internal voids with radii on the order of $\Delta/10$, but features of this size cannot appear on the surface, because of the density of the surface sampling by the outer bound.

The cost of such global bound computations is now $O(n^3)$, providing even stronger motivation to instead consider local extensions based only on the signed distance values sampled at the vertices of a cubic cell having a long diagonal of length $\sqrt{3}\Delta$. The single vertex extension and isovalue extensions developed for 2-D above extend directly to 3-D, with the adjusted diagonal length giving:

$$F_1^{3D} = [E, \overline{F}] \quad (22)$$
$$= [d_{max} - \sqrt{3} \cdot \Delta, d_{min} + \sqrt{3} \cdot \Delta]$$

$$F_{iso}^{3D} = [E, \overline{F}] \quad (23)$$
$$= \left[d_{min} - \frac{1}{2}\sqrt{3} \cdot \Delta, d_{max} + \frac{1}{2}\sqrt{3} \cdot \Delta\right]$$

$$F_\cap^{3D} = \begin{bmatrix} \text{Max}\left(d_{min} - \frac{1}{2}\sqrt{3} \cdot \Delta, d_{max} - \sqrt{3} \cdot \Delta\right), \\ \text{Min}\left(d_{max} + \frac{1}{2}\sqrt{3} \cdot \Delta, d_{min} + \sqrt{3} \cdot \Delta\right) \end{bmatrix}. \quad (24)$$

Conclusions Regarding Global Extensions Versus Local Extensions

The preceding discussion has considered the problem of bounding the allowed variation of signed distance to enable construction of interval extensions of the SDF based on sample values given on a uniform grid. This technique constructs global extensions that depend on the entire grid of sampled values and local extensions that depend only on sample values at the vertices of a cell. It will be understood that as used herein the terms "cell" or "volumetric cell" and plural forms thereof are intended to broadly encompass interval(s), square(s), and cube(s) in 1-D, 2-D, and 3-D constructions, respectively. The same concept can be extended to n dimensions, where n>3.

In 1-D constructions, the local extension has been shown to coincide with the global extension and the sample values exactly determine the SDF, except in intervals containing singular points. This simplified behavior enables a full solution of the 1-D problem to be achieved, including an optimal local criterion for root exclusion and a specification of maximum sample spacing (half the minimum feature size) allowed, while maintaining exact and unique representation.

In 2-D and 3-D, the above discussion has provided global extensions of signed distance that are optimally tight but not computationally efficient. Geometric interpretation of the global bounds suggest that, while exact and unique representation cannot be guaranteed, the global bounds do provide geometric inner and outer bounds for the boundary of the implicit object. Moreover, reasonable model precision is expected when the sample spacing is smaller than half the feature size (measured as the minimum skeletal diameter). Again motivated by the desire for computational efficiency, a pair of looser, but less expensive, local extensions have been presented that require only the identification of the minimum and maximum of the sample values at the vertices of the cell under consideration.

In some sense, the discussion above provides the ends of the spectrum in terms of the tradeoff between tight bounds and computational cost. However, it will be understood that other extensions can be constructed by explicitly including different sets of sample values (and doing non-trivial amounts of numeric or symbolic optimization), and further analysis and/or empirical results can identify an extension that provides optimum performance for root isolation on particular classes of models.

Sparse Representations

The above description pertains to a full N-dimensional array of signed distance values. Signed distance grids derived from 3-D volumetric scanners tend to comprise large data sets. Currently, typical scan data sets are often equivalent to stacks comprising hundreds or thousands of images, each image containing on the order of $10^5$ to $10^7$ pixels, and such scan data set sizes are expected to increase as scanner technology evolves. Thus, it is important to be able to store the volumetric scanner data and the information derived from the data in compressed formats.

A variety of traditional compression techniques have been applied to the raw scan data, but once segmentation has been performed and a signed distance grid has been obtained, more effective compression can be achieved using a variety of sparse representations. For example, model representations requiring less data storage can be obtained by keeping only a subset of the original data from which signed distance values can be computed at other locations. The key property of the SDF, $f(\vec{r})$ is that (away from singular points, as described below) the magnitude of the gradient is unity. As noted above, in mathematical terms, the SDF satisfies a partial differential equation known as the eikonal equation, $|\vec{\nabla}f|=1$. By keeping only an appropriate subset of the original sample data, the remainder of the data can be reconstructed as a solution of the eikonal equation using a numerical partial differential equation solving algorithm, such as the "fast marching method." (The fast marching method was introduced by James A. Sethian as a numerical method for solving boundary value problems of the form $F(x)|\nabla T(x)|=1$.)

It is important to note that an appropriate sample subset must include sufficient information to specify the zero level set (since the surface of an f-rep solid corresponds to all points where $f=0$). Two appropriate sparse representations of particular interest are discussed herein, including (1) a narrow-band representation; and, (2) a skeletal representation.

Narrow-Band Representation using a Sample Subset

The narrow band model approach involves specifying a threshold distance, D, which corresponds to a width of the narrow band that encompasses the surface of an object, and storing the signed distance grid locations and signed distance value for all grid points for which $|f|<D$. Such a model does exactly what its name implies, i.e., it keeps all the signed distance values in a band around the surface of the object. From a narrow band representation, the signed distance at any point on the grid can be recovered by employing the narrow band data as the starting condition for an eikonal equation solver (such as the fast marching method). Alternatively, an interval bound on the signed distance value at any point (or any interval) can be obtained based on the bounding hypercones generated by the signed distance grid points in the narrow band. Narrow band representations are sensible for implicit modeling applications when it is known a priori that precision is of utmost importance near the zero level set that defines the surface of the object.

Skeletal Representation of Sample Subset

Another sparse representation involves skeletal models that leverage the special property of the signed distance function. On a continuous domain, the SDF has a very well-behaved gradient (having unit magnitude, $|\nabla f|=1$ and pointing toward the nearest surface point), except at singularities where a well-defined gradient vector does not exist because a vector cannot simultaneously point in multiple directions to where the nearest surface points are located. The skeleton (or "medial axis") of an object consists of the set of interior singular points of the SDF. At least in regard to the continuous version of the skeleton, each point on the skeleton is the center of a maximal sphere that has multiple contact points where the sphere grazes the surface of the object. On the discrete grid, such special properties cannot be maintained exactly. A discrete skeletal point lies near a point on the continuous skeleton and has a distance value whose magnitude is close to the radius of the exact maximal sphere. The radius of the maximal sphere is the distance from the skeleton point to the nearest surface point, and the sphere is maximal because there is no larger sphere that contains the skeleton point and has the same contact points on the surface. The skeletal data, i.e., the skeleton together with the radii of the associated maximal spheres, provide an alternative representation of an object as a union of the maximal spheres.

While the following discussion is somewhat redundant, it is sufficiently important to bear repeating. The skeletal representation includes the signed distance values and locations at grid points that are identified as "skeletal" or "medial" (synonymous terms). A skeletal model is obtained by evaluating an estimate of the magnitude of the gradient (based on numerical estimates of the derivatives, including those obtained by connection coefficients or finite difference operators) and storing the grid location and signed distance value for all grid points where $|\nabla f|$ differs from 1 by more that a chosen threshold value $\in$, i.e., where $||\nabla f|-1|>\in$. Interior skeletal points (where $f<0$) comprise the discrete endoskeleton, and exterior skeletal points (where $f>0$) comprise the discrete exoskeleton. Using the skeletal data as the starting condition for an eikonal solver (such as the fast marching method) supports reconstruction of the entire signed distance grid. Alternatively, bounds for the signed distance at any point or over any interval are provided by the bounding hypercones associated with the skeletal points. Since the skeleton is associated with maximal spheres (and discrete skeletal points are associated with nearly maximal spheres), the skeletal points provide concise and effective bounds. In 1-D, the skeletal data is sufficient to completely specify the object.

When dealing with data sampled on a discrete grid, it is unlikely that even a few (if any) points on the skeleton will be included in the discrete grid sample. So, in the discrete grid case, the analog of the skeleton is a collection of sample points identified as lying close to the skeleton. This identification of the sample points lying close to the skeleton is performed by applying a property that the magnitude of the gradient is 1, except on the skeleton. In the discrete grid case, the gradient is estimated by employing the connection (or finite difference) coefficients to compute derivative estimates along each grid direction. Since the connection (or finite difference) coefficient vector has a non-zero length, derivative estimates at grid points near the skeleton (i.e., near singular points of the signed distance) will be affected by the nearby singularities, resulting in gradient magnitude estimates that differ significantly from 1.

Skeletal points on the grid can be identified by carrying out the following steps: (1) choose a threshold value, $\in$, corresponding to a significant difference from 1; (2) employ connection coefficients (or finite differences) to compute the derivative estimates, $f_{x_1}, \ldots, f_{x_N}$, along each grid coordination direction; (3) apply the Pythagorean theorem to compute the magnitude of the gradient as the square root of the sum of the squares of the derivatives $$\left(\text{i.e., } |\nabla f| = \sqrt{\sum_{i=1}^{N} (f_{x_i})^2}\right);$$

and, (4) test whether the point lies in the interior, $f<0$, and the gradient magnitude differs from 1 by more than the chosen threshold, i.e., $||\nabla f|-1|>\in$. The contact spheres associated with discrete skeletal points need not be maximal spheres, but each skeletal contact sphere does include at least one surface contact point, and the union of discrete skeletal spheres does provide a useful compressed representation of the solid as illustrated in the example of FIGS. 10A and 10B. FIG. 10A shows approximately 5,000 discrete skeletal points 100 that were obtained with a threshold value of $\in=0.09$ (and visualized as small spheres) for an exemplary model of a talus (i.e., an ankle bone). The full wavelet f-rep involves a 128×128×128 grid of SDF data, i.e., including over 2 million signed distance values, and an accurate polygonization includes tens of thousands of polygons, such as triangles—which is much more than the approximately 5,000 discrete skeletal points. Thus, the skeleton representation provides significant data compression capabilities compared to the full wavelet f-rep data set.

FIG. 10B shows an image 102 of the union of the skeletal spheres, which provides a good approximation of the volume occupied by the talus. The discrete skeletal data also provide support for new design tools for creating and/or editing solids by altering the location or radius of selected discrete skeletal spheres. For example, FIG. 10C shows a result of selecting all of the skeletal grid points of the talus and uniformly increasing the radius of the discrete skeletal spheres. This adjustment creates a new model 104 of the solid object having a surface 106 that is offset relative to the talus surface (as illustrated in FIG. 10D, which shows a translucent version of the new solid superimposed on the original discrete skeletal talus model).

However, the modeling capabilities of the skeletal data actually exceed what is indicated in FIG. 10A-10D, because only skeletal spheres are displayed. Alternatively, by using the skeletal data as the initial state for the fast marching algorithm, or by applying the interval bounds generated from the skeletal points, a good approximation of the entire signed distance grid can be computed and a full wavelet SDF-rep can be reconstructed.

Wavelet Compression

This approach for compressing signed distance value data employs a wavelet analysis, which consists of list correlations of the data with a vector of scaling coefficients (to produce a lower resolution version of the data), and with a vector of wavelet coefficients (to produce the high resolution details). It has been shown that a substantial majority of the high resolution coefficients (away from skeletal points) have negligibly small magnitude. The sparse wavelet representation records the signed distance grid location and magnitude of the wavelet coefficients of significant size. Useful approximations of the signed distance value at any grid point can then be obtained by wavelet synthesis from the stored coefficients (assuming that other coefficient values are effectively zero). Due to the special properties of SDFs (especially the fact that the gradient is very well behaved away from skeletal points), compression ratios for signed distance grids can be achieved that are significantly greater than similar compression applied directly to the raw volumetric scan data.

A further refinement is obtained for polyhedral objects imported as signed distance grids. Since the surface of such an object comprises polyhedra, edges, and vertices, the distance from any point to the surface of a polyhedral object corresponds with the distance from the point to a plane (of a polyhedron), a line (associated with an edge), or another point (vertex). In each of these cases, the square of the distance is a quadratic function. Thus, a suitable compression approach is to retain only the interior grid points (having negative SDF values), or only the exterior grid points (having positive SDF values). Squaring all of the resulting values produces a function that comprises regions of quadratic functions. The vanishing moments property of Daubechies wavelets then guarantees that the high resolution coefficients are identically zero, unless the wavelet coefficient vector is applied across a Voronoi boundary (i.e., the list correlation involves signed distance grid points that are associated with multiple nearest surface entities).

Remote Evaluation of Signed Distance

Both the narrow band and skeletal representations support "remote" evaluation of signed distance, i.e., the signed distance at any remote point or interval can be bounded based on these sparse representations. Operations that have been thought of as grid-based (e.g., performing a Boolean union of two objects by taking the minimum of the signed distance values in their signed distance grids at corresponding points) can also be performed directly on these sparse representations. (For the union example, simply take the minimum of the lower bounds derived from the sparse representations. If it is positive, then the point or interval in question lies exterior to the union.)

Reliable Classification From Discrete Data Grids

A general problem faced by all computer-assisted math software that includes graphics capabilities is the reliable classification from discrete data grids. The problem arises when an array of values is computed, and it is desirable to be able to produce a high-quality visualization of one or more iso-surfaces. (Iso-surfaces are surfaces on which the "function" that produced the array of values has a constant value. The zero iso-surface conventionally defines the surface of implicit models.) However, the underlying function is typically either not explicitly known or is too expensive to compute; only the discrete array is directly available. In the general context, this problem is very hard to solve, because the function can do just about anything between the data points. The usual approach is to make the minimal assumption of continuity, which allows a conclusion to be reached that the zero iso-surface must pass through any cube (the grid spacing need not be the same along different coordinate directions, but the term "cube" is used throughout this document instead of "right rectangular parallelepiped" for simplicity of presentation), whose vertices include both positive and negative values. For large data sets, it is tempting to start this analysis at a resolution coarser than the grid spacing and then refine cubes that are found to contain portions of the surface. However, such an approach is not reliable. In the case of general data, based on the vertex values, it is impossible to guarantee that the cube does not contain zeros of the function that produced the values.

In the specialized situation where the grid comprises signed distance values, the situation changes dramatically. Applying a local bound on the signed distance, it is guaranteed that the cube is empty if the lower bound over the cube is positive, and conversely, the cube is completely occupied, if the upper bound is negative. If the signed distance value bound includes zero and the cube edge is larger than the grid spacing, the cube can be subdivided for more refined classification. More importantly, these tests can be performed reliably starting from the lowest possible resolution, i.e., by initially considering one large cube that encompasses the entire data set.

If the object of interest is fully contained within this cube, the values at all of the vertices will be positive. (Clearly, a traditional approach based on detecting vertex sign changes would improperly discard the entire large cube and, with it, the entire object.) However, unless one of the vertex values is greater than the long diagonal of the cube (or if they are all greater than half the long diagonal, or if some alternative tighter interval bound excludes zero), then the cube may contain negative function values, and the cube can be subdivided for more refined classification. If a cube is left as unclassified (neither completely interior nor completely exterior) at the finest possible resolution (i.e., a resolution corresponding to the grid spacing), then the surface of the object may pass through the cube. Even cubes that have positive vertex values are appropriately identified, if their vertex values are so small that the possibility of negative values within the cube cannot be ruled out by the interval bounds. The net result is that the space can be reliably subdivided into cubes that are IN (fully interior to the object), OUT (fully exterior to the object), or ON (possibly containing a portion of the surface). The ON cubes can be further classified based on the signs of their vertex values as CONTAINING THE SURFACE because the cubes have vertex values of opposite sign, POSSIBLY FULLY EXTERIOR because all vertex values of the cubes are positive but small enough to allow negative interior values, and POSSIBLY FULLY INTERIOR because all vertex values of the cubes are negative but small enough in magnitude to allow positive interior values. Tighter interval bounds (discussed below) may provide more accurate classification of the "POSSIBLY" cubes, but completely deciding IN/OUT/CONTAINING THE SURFACE (even for signed distance functions) may require more information than what is provided by the signed distance grid of data. As a practical matter, the IN/OUT/ON classification based on simple, local bounds proceeds effectively and efficiently. For sample cases that have been studied to date, the number of cubes analyzed during this procedure is typically less than 10% of the total number of cubes in the grid.

Alternative Bounds (2-D and Higher Dimensions)

The discussion provided above has introduced the idea of interval bounds for a signed distance function and has looked at the implications of some simple and inexpensive local bounds involving the largest and smallest of the values at the cube vertices. The same ideas apply with other bounds, but there can be a tradeoff between tightness of the bound and cost of the computation.

An example of a tighter bound that applies in 2-D is as follows. A square of edge e can be subdivided (with a diagonal edge) into two triangles. The diagonal edge is drawn through the vertex with the smallest signed distance value, and that point is established as the origin of a local coordinate system so that $f(0,0)=d_0$. Without loss of generality, the other vertices are then located at $(e,0)$ and $(e,e)$, and the signed distance values are: $f(e,0)=d_0+a$ and $f(e,e)=d_0+b$ with $0<b/e<1$ and $0<c/e<\sqrt{2}$. A lower bound for the signed distance over the triangle is given by:

$$f_{min} > d_0 + e \max\left\{\frac{\sqrt{2}}{2}\cdot\left(\frac{a}{e}-1\right), -1+\frac{b\sqrt{2}}{2e}\right\}. \quad (25)$$

This bound is typically accurate to at least about 0.15e. But, it should be noted that more accurate (and much more complicated) bounds can be determined and applied, if desired. A similar approach is applicable to a cube (three dimensions) that is subdivided into six tetrahedra.

Ray tracing (or Ray casting) with Safe Step Sizes

The bounds described above are also useful for other methods of interrogating the model of an object. For example, ray tracing methods can be employed for accurate visualization, silhouette computation, and volume estimation. Ray tracing simulates the physics of an object illumination by emitting rays from a virtual light source and determining how they bounce off the object or objects in a scene to reach an eye of a virtual observer. A fundamental operation involves accurately determining where a ray intersects the surface of an object. For objects modeled by signed distance functions, a simple stepping approach works well. Step along the ray until reaching a point sufficiently close to the surface (i.e., a point with a distance value below a predefined threshold). For general functions, there is no good way to know how large a step can be taken without missing details of the scene. However, when the scene is described by distance values, a step equal to the magnitude of the distance value can safely be taken without overshooting the surface. It should be noted that each step along the ray does not necessarily land on a grid point with a known distance value. The distance bounds discussed above can be used to determine a safe step size to be taken from a non-grid point. A current exemplary embodiment employs single-point local bound evaluated at a current point on the ray to determine the size of the ensuing step along the ray.

Classification of Intervals

As discussed in the parent of this application, an essential operation of a solid modeling system is point membership classification, i.e., determining whether a point lies inside, outside, or on the surface of a solid object. Based on the special properties of the SDF, bounds can be constructed on the value of the signed distance across finite intervals of the modeling domain. In a one-dimensional (1-D) application of this approach, an interval X is just the segment between a lower bound, $\underline{x}$, and an upper bound, $\overline{x}$, i.e., $X=[\underline{x},\overline{x}]\equiv\{x|$ $\underline{x}\leq x\leq\overline{x}, x,\overline{x}\in P\}$, as noted above. In higher dimensions, an interval is the tensor product of 1-D intervals, so a two-dimensional (2-D) interval can be thought of as a rectangle and a 3-D interval as a block. (For simplicity of presentation, this description focuses on the 3-D case, with uniform spacing along each coordinate direction, and higher-dimensional intervals can be thought of as hypercubes.)

When comparing the signed distance values at any two points, the unit magnitude gradient property, $|\nabla f|=1$, provides a fundamental relationship: the difference in SDF value at two points cannot exceed the distance between the points. Thus, every data point where the SDF is known, e.g., $f(\vec{r}_{ijk})=f_{ijk}$, where the indices specify a location on the grid of sample points, provides upper and lower bounds for the SDF value at every other point:

$$f_{ijk}-d < f(\vec{r}) < f_{ijk}+d \quad (26)$$

where d is the distance from a point of known value, i.e., $d=|\vec{r}-\vec{r}_{ijk}|$. In interval language, this relationship produces an interval extension of the SDF, i.e., an interval valued function that is guaranteed to include the real value of the signed distance at the point of interest. If these interval functions are then plotted, each data point generates a pair of bounding 45° hypercones. One hypercone is point-down and provides an upper bound on SDF values at other points. The other hypercone is point-up and provides a lower bound on SDF values at other points. At any specified evaluation point, the hypercones generated by each grid point determine a bounding interval for the SDF at the evaluation point. Since the bounds associated with all sample points must be satisfied, the actual SDF value must lie in the intersection of the collection of bounding intervals, $$X_{global} = [\underline{f}_{global}, \overline{f}_{global}]$$

$$= \bigcap_{ijk}[\underline{f}_{ijk}, \overline{f}_{ijk}].$$

Since the boundary of an f-rep is conventionally associated with $f=0$, the point is then classified by whether 0 is contained in the bounding interval. If $\overline{f}_{global}<0$, then the point must lie in the exterior region, since the SDF value must be positive. If $\underline{f}_{global}>0$, then the point must be disposed in the interior of the object, since the SDF value must be negative. If $0\in X_{global}$, then the point may lie on the boundary of the solid. Note that global bounds that consider all sample points are costly to compute, so more efficient local alternative approaches have been created, as discussed below.

One approach is to again consider skeletal points. Since skeletal points correspond to the points that are furthest interior, their point-down hypercones that provide an upper bound at other points are of primary relevance. Once again, since the bounds generated by all known SDF values must be satisfied, the overall skeletal upper bound is the least of the upper bounds generated by the individual skeletal points: $f(\vec{r})<\overline{f}_{skeletal}=\text{Min}[f(\vec{r}_s)+|\vec{r}-\vec{r}_s|]$, where s indexes the skeletal points. Similarly, external singularities of the SDF comprise the exoskeleton, and exoskeletal points are identified as grid points where $f>0$ and $\||\nabla f|-1|>\in$. Exoskeletal points are, in a sense, farthest from the surface, have the largest SDF values, and their point-up lower bound hypercones are relevant. The exoskeletal points provide the lower bound defined by: $f(\vec{r})>\underline{f}_{skeletal}=\text{Max}[f(\vec{r}_e)-|\vec{r}-\vec{r}_e|]$, where e indexes the exoskeletal spheres. Putting these bounds together, a direct skeletal-based test is provided for point classification. The point $\bar{r}$ is interior if $\mathcal{F}_{skeletal}<0$, is exterior if $\mathcal{F}_{skeletal}>0$, and may be a surface point if $0 \in F_{skeletal}=[\underline{f}_{skeletal}, \overline{f}_{skeletal}]$ In stark contrast to the fast marching method mentioned above (where SDF values are computed at neighboring points with known values until the point of interest is eventually reached), this skeletal approach provides a direct means for bounding the SDF value and classifying points that lie a considerable distance away, but without evaluating at intervening points. This "remote" evaluation approach is useful for supporting binary CAD operations based on the more sparse skeletal data rather than full SDF grids. (Note that "semi-global" bounds can be obtained from any subset of the sample set, but generally both the lower and upper bounds from each sample point can be relevant. Moreover, generic sample subsets are not guaranteed to capture the geometry of the solid.)

Local Interval Bounds

A second important approach to gain significant efficiency is based on local bounds. The efficiency gain occurs in two ways: (1) an interval bound applies over an input interval that spans a gap between sample points (rather than at just a single point); and, (2) the local bound depends only on a subset of the sample values within the cube, e.g., the sample values at the vertices of the input interval. Again using a uniformly sampled 3-D grid for discussion, consider a cube whose eight vertices are sample points at which the SDF value is known. This approach employs bounds that are valid across the entire cube, but depend only on the vertex values of the cube. (It will be apparent that the dimensions or sides of this cube need not correspond to the sample spacing intervals. When applied to larger cubes, local bounds support multi-resolution classification.) If the cube edge length is $\delta$, then the cube's long diagonal has a length equal to $\delta\sqrt{3}$. Since the signed distance value between two points cannot differ by more than the distance between the points (and the distance between any two points within the cube cannot exceed the long diagonal extending between vertices of the cube), the SDF at any two points in the cube cannot differ by more than $\delta\sqrt{3}$. If the eight SDF values at the vertices are designated as: $\mathcal{F}=\{f_1, \ldots, f_8\}$, let $f_{min}=\text{Min}[\mathcal{F}]$ and $f_{max}=\text{Max}[\mathcal{F}]$, then a valid bounding interval across the cube is: $f(\vec{r}) \in F_1 = [f_{max}-\delta\sqrt{3}, f_{min}+\delta\sqrt{3}]$. In other words, the SDF value at any point in the cube must not be less than the maximum vertex value minus the long diagonal, or greater than the minimum vertex value plus the long diagonal.

Another such bound is obtained by noting that if the SDF value decreases below $f_{min}$, then it must have space to increase back to a higher value before another vertex (with a higher SDF value) is reached. In direct analogy with the old saying that "you can't go more than halfway into the woods," the minimum SDF value within the cube cannot be less than half the long diagonal less than the minimum vertex value. Inverting the argument for the upper bound, another local bound is obtained:

$$f(\vec{r}) \in F_2 = \left[ f_{min} - \frac{1}{2}\delta\sqrt{3},\ f_{max} + \frac{1}{2}\delta\sqrt{3} \right].$$

Again, both bounds must be satisfied, so $f(\vec{r}) \in F_1 \cap F_2$ across the cube.

Recall the statement above that the local bounds can be applied to a grid at any scale. For example, consider a torus as a sample part or solid object. (A torus is selected for this example, because its exact SDF is available for comparison and verification.) When the torus SDF is sampled uniformly on a 129×129×129 grid, there are $128^3$ (somewhat more than $2 \times 10^6$) cubes, each having an edge with a length 1. A traditional approach to handling regularly sampled data in 3-D involves octrees, which are a multi-resolution spatial occupancy description that attempts to classify cubes as full, empty, or partially occupied (and which is appropriate for subdivision and inspection at finer resolution), based on detecting sign difference at cube vertices. With typical sample data, however, there is no guarantee that examining the grid at coarse resolution will not miss finer details that are hidden inside a large cube (e.g., all the vertex values may be positive, but there may be a region of negative values in the interior of the cube). The result is that a careful classification normally involves the expensive computation of inspecting all cubes at the smallest scale and then consolidating similar classifications where possible to obtain a condensed representation. Clearly, this complete evaluation would not provide any computational benefit.

However, the local bounds described above change the situation completely and provide a method for reliably creating octrees, starting at the coarsest level. Beginning with a cube containing the entire sample grid, it is only necessary to consider the extreme corner values (i.e., the vertices) and the edge length of 128. Since one of the corner values has magnitude less than $128\sqrt{3}$, the interval bound contains 0. Thus, the cube can next be divided into eight equal smaller cubes, each with an edge length equal to 64. The SDF values at the vertices of these smaller cubes are considered, interval bounds are computed for each, and the process continues until the smallest cubes are classified, or further subdivision is not possible with the given data.

FIG. 11 illustrates the result of the guaranteed or reliable octree classification for one quadrant of an exemplary torus 110. Interior cubes and exterior cubes are shown in different shades of gray to represent their level of subdivision or cube size. Certain of the cubes are not yet classified, and cannot be further subdivided because their edge length is equal to the sample spacing. (Since the analytic SDF for torus 110 is known, it would be possible to produce finer data (resulting in even smaller cubes) to achieve increased resolution of the boundary. However, classification of these cubes based solely on the given data set would be unreliable and inadvisable.) It is important to note that this method of interrogation and classification based on local bounds produces significant savings. The total number of vertices inspected during this procedure (190,267) amounts to less than 9% of the total number of vertices in the grid, and the savings typically become more significant with an increasing number of points in the sample grid. Despite not inspecting over 90% of the vertices, the classification is known to be correct, and all cubes that cannot be classified reliably based on the given data are marked as unclassified. While it is still expected that other methods such as ray tracing might produce higher quality images of wavelet f-rep solids, this guaranteed octree approach based on interval bounds provides a useful method for initial visualization and analysis. FIG. 12 shows a rendering 120 of the torus boundary cubes with gray-scale shading based on the wavelet derivative estimate of the surface normal. Note that spatial decomposition based on SDF grids can also be performed using tighter interval bounds on the SDF. However, the tighter bounds are computationally more expensive.

Flowchart Illustrating Exemplary Steps for Implementing the Novel Approach

A flowchart 130 shown in FIG. 13 illustrates exemplary steps for implementing different aspects of the novel approach discussed above. This approach is implemented using volumetric scan data that have been collected for an N-dimensional object, as indicated in a block 132. In some of the examples that are discussed herein, a 3-D object such as part of a patient's body is the object; however, it should be understood that the object is not limited to part of a body, but can be almost any type of object. Furthermore, the object can have more or fewer than three dimensions. A step 134 provides for carrying out an N-dimensional scan of the object, for example, using a CT, MR, PET, or other type of volumetric scanner. The result of this scan is an image stack 136, in which the object is delineated from surrounding material based on a characteristic, such as intensity. While the term "object" is used in the singular form, it will be understood that a plurality of objects of interest may be scanned so that a model can be produced for each object or group of objects using the present novel approach. For example, if an CT scanner is employed, the image stack may represent generally parallel contiguous "slices" through one or more objects (such as one or more bones) and any surrounding material (such as tissue), wherein the object is visually apparent in the images because it has a substantially different intensity or gray-scale value than the surrounding material. However, it must be stressed that segmentation of the raw image data, which is carried out in the following step, is not simply a matter of applying a threshold test. Indeed, a step 138 provides for converting the intensities (or other characteristic, such as color) of the voxels comprising the image stack data using segmentation (which may optionally use a level sets algorithm, such as the exemplary approach discussed above) to produce signed distance values on a signed distance grid 140. Based on the characteristic of the image stack data, this step determines the distance from the center of the voxels comprising the image stack data to the nearest point on the surface of the object. Voxels that have a positive signed distance value are thus outside the object, while those with a negative value are inside the object.

At this point, several alternative approaches can be employed to achieve a more effective representation. A narrow band that encompasses the surface of the object of interest can be defined by specifying a width for the band. In a step 146, interval bounds from narrow-band points can be applied to produce a narrow-band representation and support related operations, as indicated in a block 148. In the narrow-band representation, all of the signed distance values in the band around the surface of the object and the corresponding grid locations are retained. As indicated above, the signed distance values for any point on the signed distance grid can be recovered by employing an eikonal equation solver (such as the fast marching method) using the narrow-band signed distance value data as the starting condition, or the interval bound on the signed distance value at any point or interval can be determined based on the bounding hypercones generated by the signed distance grid points that are in the narrow band.

Another approach is indicated in a step 150, which applies interval bounds to the interval SDF representation, from skeletal points, on points or intervals. This approach produces a skeletal-based representation and related operations, as indicated in a step 152. The above-discussion explains the steps that can be employed for determining the point classification of skeletal points on the signed distance grid based on the skeletal bounds.

Yet another approach recognizes that it is less computationally complex to applying local rather than global interval bounds on intervals. This approach, which starts at a coarse level of cube resolution and proceeds to increasingly finer resolution by subdividing selected cubes, is implemented in a step 154. The result is a reliable interval octree classification 156 in which the smallest cubes are classified as completely exterior, or completely interior, or on the surface of the object, or as possibly being fully interior or fully exterior, or as cubes for which further subdivision is not possible without loss of reliability—given the data provided.

Still another approach that is referenced in a step 158 is to apply local interval bounds at a point, which yields a step size for ray tracing (or ray casting) and root finding, as indicated in a block 160. Again, the approach for doing so is explained above.

To further improve the signed distance value representation of the volumetric scan data, a step 142 applies a unit magnitude gradient property, as explained above, yielding an interval value SDF representation with the tightest possible SDF bounds, as indicated in a block 144.

Flowchart for Spatial Decomposition Using Octree Approach

Exemplary logical steps 170 illustrated in FIG. 14 can be employed for evaluating signed distance value data for signed distance grid 140 so that a region in which the object of interest is located can be divided into successively smaller cubes using the octree decomposition approach. A step 172 provides for identifying corner vertices of a cube (initially, a large cube that encompasses the region occupied by the object of interest), to produce vertex SDF values 174. Next, a step 176 applies local SDF bounds to the SDF values at the vertices of the cube to determine an interval SDF bound over the cube, $D_{min} \leq SDF \leq D_{max}$, as noted in a block 178. A decision step 180 then provides for examining the bounds to determine whether the cube being evaluated is empty of any portion of the object of interest, or may include a portion of the surface of the object, or may be fully occupied by a portion of the object. If the examination of the cube determines that $D_{min} > 0$, the result indicated in a block 182 is that the cube is empty, and the resulting data are stored in block 184. If the value of $D_{max} < 0$, then the result indicated in a block 194 is that the cube is fully occupied, and that result is stored as data in block 184. Finally, if $D_{min} \leq 0 \leq D_{max}$, the cube may contain part of the surface of the cube (and be partially occupied), as indicated in a block 186. A decision step then determines if the length of the edge of the cube is greater than the spacing between points for the signed distance grid. If so, a step 190 subdivides the cube in eight smaller cubes to refine the classification of the cubes as noted above. The logic then loops back to step 172, to identify the vertices of the corners for the next cube being evaluated. If the result of decision step 188 is negative, the current cube being examined is classified as an ON cube in a step 192—i.e., to provide an indication that part of the surface may be included in the cube. That result is also stored in data, in block 184. After storing a result in the data, while not shown, it will be understood that the process reiteratively continues with the next cube to be examined until all cubes that can be further subdivided have (in step 190), and all of the cubes that have been produced by subdividing larger cubes and are neither empty nor full have been examined.

Flowchart for Creating Sparse Representation of Signed Distance Values

Exemplary steps 200 for creating a sparse representation of the signed distance values (i.e., representing the signed distance values using less data) are illustrated in the flowchart shown in FIG. 15. Starting with the data for signed distance grid 140, one of three different approaches can be employed to produce a sparse representation. The first approach is indicated in a step 202 where the signed distance values and signed distance grid location are stored for all points meeting the requirement that the absolute value of the signed distance function, $f$, is less than a predefined width of a narrow band that encompasses the surface of the object of interest. This approach produces a narrow band model 204. Alternatively, instead of following this approach, a step 210 provides for storing the signed distance values and locations of all points in the signed distance grid for which the absolute value of the gradient off differs from 1 by more than a threshold value. The result is a skeletal model 212. Both narrow band model 204 and skeletal model 212 are sparse representations of the full signed distance value data.

For either narrow band model 204, or skeletal model 212, reconstructed signed distance information 208 can be obtained in a step 206 by applying SDF interval bounds to the data in the model.

Another alternative approach to producing a sparse representation is indicated in a step 214, which provides for performing a wavelet analysis of the signed distance values of signed distance grid 140. The result is to produce wavelet coefficients 216. A step 218 then provides for storing the signed distance values and locations of the wavelet coefficients that are of a significant magnitude (i.e., above a predefined threshold level), yielding a wavelet compressed model 220. To recover reconstructed signed distance information 208, wavelet synthesis 222 is applied to the wavelet compressed model.

Exemplary System for Creating Solid Models

FIG. 16 schematically illustrates an exemplary system suitable for implementing the present novel technique. The system includes a generally conventional computing device 264 that is configured to access volumetric scanning data produced by a scanning device 250 and stored on a data store 251. Scanning device 250 may be, for example, a computed tomography scanner, a magnetic resonance scanner, a positron emission tomography scanner, or any other type of scanner that produces volumetric scanning data of article(s), or object(s)—either organic or inorganic. Computing device 264 may be a generally conventional personal computer (PC), such as a desktop, a laptop, a notebook, or a server, or may be a distributed computing system, or other type of computing device. Details of the scanning device need not be shown since the source of the volumetric data stored on data store 251 is not particularly relevant to the present approach, so long as the volumetric data are suitable for processing to create a solid model of the article(s) or object(s) scanned as explained above.

Computing device 264 is coupled to a display 268, which is used for displaying solid model images to an operator. Included within computing device 264 is a processor 262, a memory 266 (with both read-only memory (ROM) and random-access memory (RAM)), a non-volatile storage 260 (such as a hard drive or other non-volatile data storage device) for storage of the solid model data, digital signals, and software programs, an interface 252 that is coupled over a data link (such as an Ethernet system, a network, or serial data communication line, or a wireless link—without any implied limitation), and an optical drive 258 are coupled to processor 262 through a bus 254. Optical drive 258 can read a compact disk (CD) 256 (or other optical storage media, such as a digital video disk (DVD)) on which machine instructions are stored for implementing the present novel technique, as well as other software modules and programs that may be run by computing device 264. The machine instructions are loaded into memory 266 before being executed by processor 262 to carry out the steps for implementing the present novel technique.

Processor 262 executes the machine instructions stored in memory 266 to implement the steps that convert the volumetric scan data accessed in data store 251 to produce a corresponding solid model. The resulting solid model data are optionally stored on storage 260 so that selected images can subsequently be displayed on display 268, or can instead be directly displayed as soon as the solid model data have been produced. The solid model data can be used for various applications, such as creating replicas of the article(s) or object(s) scanned by the scanning device.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A method for creating a model of an object, comprising the steps of:
   (a) providing volumetric scan data produced by using a scanner to scan region in which at least a portion of the object is disposed;
   (b) processing the volumetric scan data with a computing device to create a signed distance grid of points, each point in the signed distance grid corresponding to a vertex of a volumetric cell in the volumetric scan data and being associated with a signed distance value specifying a distance from the point to a surface of the object, a sign of the signed distance value for each point indicating whether the point is interior or exterior to the object;
   (c) applying a unit magnitude gradient to the signed distance values, for determining an interval signed distance function representing the boundary of the object, to define a model of the object; and
   (d) using the signed distance value at points on the signed distance grid for which the signed distance value is known, to determine upper and lower local interval bounds for the signed distance value at other points or sets of points, where a difference between the signed distance values of two points cannot exceed the distance between the points.

2. The method of claim 1, further comprising the step of identifying a minimum sample value and a maximum sample value in the signed distance data at vertices of each volumetric cell, to determine local extensions that define local interval bounds for the object.

3. The method of claim 2, wherein if the object is two-dimensional, further comprising the steps of:
   (a) determining signed distance values of vertices of the two-dimensional object;
   (b) establishing a vertex of the two-dimensional object that has the smallest signed distance value as an origin of a local coordinate system;
   (c) dividing the two-dimensional object into triangles using a diagonal line that extends between the origin and a diagonally opposite vertex;
   (d) assigning signed distance values for each other vertex of the two-dimensional object relative to the local coordinate system; and
   (e) establishing a local bounds for a triangle of the two-dimensional object as a function of the signed distance value of the origin and of at least one other vertex of the triangle.

4. The method of claim 2, wherein if the object is three-dimensional, further comprising the steps of:
   (a) determining signed distance values of vertices of the three-dimensional object;

(b) establishing a vertex of the three-dimensional object that has the smallest signed distance value as an origin of a local coordinate system;

(c) dividing the three-dimensional object into tetrahedra using a diagonal line that extends between the origin and a diagonally opposite vertex;

(d) assigning signed distance values for each other vertex of the three-dimensional object relative to the local coordinate system; and (e) establishing a local bounds for a tetrahedron of the three-dimensional object as a function of the signed distance value of the origin and of at least one other vertex of the tetrahedron.

5. The method of claim 1, further comprising the step of creating an interval octree representation by implementing the steps of:

(a) initially employing a coarse octree cube level of resolution for the region; and (b) successively subdividing coarser octree cubes into finer resolution octree cubes.

6. The method of claim 5, wherein the step of employing the coarse octree cube comprises the step of employing an initial octree cube sized to encompass an entire region that was scanned to produce the volumetric scan data.

7. The method of claim 5, further comprising the steps of:

(a) classifying each octree cube as empty, partially full, possibly partially full, or full, of at least a part of the object; and (b) using the interval signed distance function to determine bounds for each octree cube, to determine if further subdivision is needed for properly classifying the octree cube.

8. The method of claim 7, further comprising the step of treating any octree cube having an edge length that is equal to the sample spacing between points on the signed distance grid as possibly containing one or more portions of the surface of the object, and not subdividing into higher resolution octree cubes, since classification of resulting smaller octree cubes based solely on the volumetric scanner data would produce unreliable results.

9. The method of claim 1, wherein the step of processing the volumetric scan data with a computing device comprises the step of segmenting the volumetric scan data to produce the signed distance grid of points and to determine the signed distance values specifying the distances from the points to the surface of the object.

10. The method of claim 1, further comprising the step of employing wavelets to interpolate known signed distance values at vertices of volumetric cells in the scanned data, to produce a wavelet-signed distance function-representation model in which an interpolant wavelet function provides signed distance values between the points of the signed distance grid.

11. The method of claim 1, wherein the step of providing the volumetric scan data comprises the step of providing an appropriate subset of the volumetric scan data with sufficient information to specify a zero level set, in which a surface of a functional representation object corresponds to all points where the value of the function is zero, further comprising the step of reconstructing a remainder of the volumetric scan data as a solution of an eikonal equation.

12. The method of claim 11, wherein the step of providing the appropriate subset of the volumetric scan data comprises the step of employing one representation selected from the group of representations consisting of:

(a) a narrow-band representation of the volumetric scan data;

(b) a skeletal representation of the volumetric scan data; and (c) a wavelet compressed representation of the volumetric scan data.

13. The method of claim 12, wherein the step of providing the appropriate subset of the volumetric scan data comprises the step of including only signed distance values and points on the signed distance grid where a magnitude of the signed distance value is less than a predefined threshold, so that the appropriate subset of the volumetric scan data are for a narrow band that extends for a predefined distance on either side of the surface of the object, and wherein the surface of the object is defined by points where the signed distance value is equal to zero.

14. The method of claim 12, wherein the step of providing the appropriate subset of the volumetric scan data comprises the step of including only signed distance values and points on the signed distance grid that are identified as skeletal.

15. The method of claim 14, wherein for a continuous skeleton, the step of including only signed distance values and points that are identified as skeletal comprises the step of including a set of singular points on the signed distance grid that is disposed in the interior of the object, wherein each of said singular points is at a center of a maximal sphere that has multiple contact points where the maximal sphere grazes the surface of the object.

16. The method of claim 14, wherein the step of including only signed distance values and points that are identified as skeletal comprises the step of including a set of singular points on the signed distance grid that is disposed in the interior of the object, wherein an estimated magnitude of a gradient for the signed distance function at each of said singular points differs from unity by more than a threshold value.

17. The method of claim 12, further comprising the step of producing the wavelet compressed representation by performing a wavelet analysis using correlations of the signed distance values with a vector of scaling coefficients, to produce lower resolution results, and with a vector of wavelet coefficients, to produce higher resolution results.

18. The method of claim 17, further comprising the step of recovering approximate signed distance values for points of the signed distance grid by applying a wavelet synthesis function to non-zero results of the wavelet compressed representation.

19. The method of claim 12, wherein the object comprises a polyhedral object, and wherein the signed distance values for the polyhedral object correspond to distances from any point on the signed distance grid to a plane comprising a portion of the surface of the object, or to a line associated with an edge of the object, or to a vertex of the object, further comprising the steps of:

(a) selectively retaining either only interior points of the object on the signed distance grid, for which the signed distance values are negative, or only exterior points of the object on the signed distance grid, for which the signed distance values are positive;

(b) squaring the signed distance values that are retained to produce regions of quadratic functions; and (c) using Daubechies wavelets in connection with the regions of the quadratic functions, producing the wavelet compressed representation, wherein resulting high resolution coefficients are equal to zero unless a wavelet coefficient vector is applied across a Voronoi boundary comprising a region closest to a surface plane, an edge, or a vertex of the polyhedral object.

20. The method of claim 12, wherein, for either the narrow-band representation or the skeletal representation, when a plurality of objects is disposed in the region, further comprising the steps of determining a function of the signed distance values at corresponding points for each object; and, logically combining the function of signed distance values thus determined to classify the points in a combination of the plurality of objects.

21. The method of claim 12, wherein for either the narrowband representation or the skeletal representation, when a plurality of objects is disposed in the region, further comprising the steps of determining a function of the signed distance value over corresponding regions for each object; and, logically combining the function of signed distance values thus determined to classify the regions in a combination of the plurality of objects.

22. A system for creating a model of an object, comprising:
(a) a display for visually viewing a model of an object;
(b) a memory in which volumetric scan data and machine readable and executable instructions are stored; and
(c) a processor coupled to the display and to the memory, the processor accessing the volumetric scan data and executing the machine readable and executable machine instructions to implement a plurality of functions, including:
(i) processing the volumetric scan data to create a signed distance grid of points, each point in the signed distance grid corresponding to a vertex of a volumetric cell in the volumetric scan data and being associated with a signed distance value specifying a distance from the point to a surface of the object, a sign of the signed distance value for each point indicating whether the point is interior or exterior to the object;
(ii) applying a unit magnitude gradient to the signed distance values, for determining an interval signed distance function representing the boundary of the object, to produce a model of the object; and
(iii) using the signed distance value at points on the signed distance grid for which the signed distance value is known, to determine upper and lower local interval bounds for the signed distance value at other points, where a difference between the signed distance values of two points cannot exceed the distance between the points.

23. The system of claim 22, wherein the machine instructions further cause the processor to identify a minimum sample value and a maximum sample value in the signed distance data at vertices of each volumetric cell, to determine local extensions that define local interval bounds for the object.

24. The system of claim 23, wherein the machine instructions further cause the processor to produce the wavelet compressed representation by performing a wavelet analysis using correlations of the signed distance values with a vector of scaling coefficients, to produce lower resolution results, and with a vector of wavelet coefficients, to produce higher resolution results.

25. The system of claim 24, wherein the machine instructions further cause the processor to recover approximate signed distance values for points of the signed distance grid by applying a wavelet synthesis function to non-zero results of the wavelet compressed representation.

26. The system of claim 23, wherein if the object is two-dimensional, the machine instructions further cause the processor to:
(a) determine signed distance values of vertices of the two-dimensional object;
(b) establish a vertex the two-dimensional object that has the smallest signed distance value as an origin of a local coordinate system;
(c) divide the two-dimensional object into triangles using a diagonal line that extends between the origin and a diagonally opposite vertex;
(d) assign signed distance values for each other vertex of the two-dimensional object relative to the local coordinate system; and
(e) establish a local bounds for a triangle of the two-dimensional object as a function of the signed distance value of the origin and of at least one side of the triangle.

27. The system of claim 23, wherein if the object is three-dimensional, the machine instructions further cause the processor to:
(a) determine signed distance values of vertices of the three-dimensional object;
(b) establish a vertex of the three-dimensional object that has the smallest signed distance value as an origin of a local coordinate system;
(c) divide the three-dimensional object into tetrahedra using a diagonal line that extends between the origin and a diagonally opposite vertex;
(d) assign signed distance values for each other vertex of the three-dimensional object relative to the local coordinate system; and
(e) establish a local bounds for a tetrahedron of the three-dimensional object as a function of the signed distance value of the origin and of at least one side of the tetrahedron.

28. The system of claim 22, wherein the machine instructions further cause the processor to create an interval octree representation by:
(a) initially employing a coarse octree cube level of resolution for the region; and
(b) successively subdividing coarser octree cubes into finer resolution octree cubes.

29. The system of claim 28, wherein the machine instructions further cause the processor to employ an initial octree cube sized to encompass an entire region that was scanned to produce the volumetric scan data.

30. The system of claim 28, wherein the machine instructions further cause the processor to:
(a) classify each octree cube as either empty, partially full, possibly partially full, or full, of at least a part of the object; and
(b) use the interval signed distance function to determine bounds for each octree cube, to determine if further subdivision is needed for properly classifying the octree cube.

31. The system of claim 30, wherein the machine instructions further cause the processor to treat any octree cube having an edge length that is equal to the sample spacing between points on the signed distance grid as possibly containing one or more portions of the surface of the object, and not subdividing into higher resolution octree cubes, since classification of resulting smaller octree cubes based solely on the volumetric scanner data would produce unreliable results.

32. The system of claim 22, wherein the machine instructions further cause the processor to segment the volumetric scan data to produce the signed distance grid of points and to determine the signed distance values specifying the distances from the points to the surface of the object.

33. The system of claim 22, wherein the machine instructions further cause the processor to employ wavelets to interpolate known signed distance values at the vertices of volumetric cells in the scanned data, to produce a wavelet-signed distance function-representation model in which an interpolant wavelet function provides signed distance values between the points of the signed distance grid.

34. The system of claim 22, wherein the machine instructions further cause the processor to provide an appropriate subset of the volumetric scan data with sufficient information to specify a zero level set, in which a surface of a functional representation object corresponds to all points where the value of the function is zero, and to reconstruct a remainder of the volumetric scan data as a solution of an eikonal equation.

35. The system of claim 34, wherein the machine instructions further cause the processor to employ one representation selected from the group of representations consisting of:
(a) as narrow-band representation of the volumetric scan data;
(b) a skeletal representation of the volumetric scan data; and
(c) a wavelet compressed representation of the volumetric scan data.

36. The system of claim 35, wherein the machine instructions further cause the processor to include only signed distance values and points on the signed distance grid where a magnitude of the signed distance value is less than a predefined threshold, so that the appropriate subset of the volumetric scan data are for a narrow band that extends for a predefined distance on either side of the surface of the object, and wherein the surface of the object is defined by points where the signed distance value is equal to zero.

37. The system of claim 35, wherein the machine instructions further cause the processor to include only signed distance values and points on the signed distance grid that are identified as skeletal.

38. The system of claim 37, wherein for a continuous skeleton, the machine instructions further cause the processor to include a set of singular points on the signed distance grid that is disposed in the interior of the object, wherein each of said singular points is at a center of a maximal sphere that has multiple contact points where the maximal sphere grazes the surface of the object.

39. The system of claim 37, wherein the machine instructions further cause the processor to include a set of singular points on the signed distance grid that is disposed in the interior of the object, wherein an estimated magnitude of a gradient for the signed distance function at each of said singular points differs from unity by more than a threshold value.

40. The system of claim 35, wherein the object comprises a polyhedral object, and wherein the signed distance values for the polyhedral object correspond to distances from any point on the signed distance grid to a plane comprising a portion of the surface of the object, or to a line associated with an edge of the object, or to a vertex of the object, and wherein the machine instructions further cause the processor to:
(a) retain either only interior points of the object on the signed distance grid, for which the signed distance values are negative, or only exterior points of the object on the signed distance grid, for which the signed distance values are positive;
(b) square the signed distance values to produce regions of quadratic functions; and
(c) use Daubechies wavelets in connection with the regions of the quadratic functions, to produce the wavelet compressed representation, wherein resulting high resolution coefficients are equal to zero unless a wavelet coefficient vector is applied across a Voronoi boundary comprising a region closest to a surface plane, an edge, or a vertex of the polyhedral object.

41. The system of claim 35, wherein, for either the narrow-band representation or the skeletal representation, when a plurality of objects is disposed in the region, the machine instructions further cause the processor to:
(a) determine a function of the signed distance values at corresponding points for each object; and
(b) logically combine the function of the signed distance values thus determined to classify the points in a combination of the plurality of objects.

42. The system of claim 35, wherein for either the narrow-band representation or the skeletal representation, when a plurality of objects is disposed in the region, the machine instructions further cause the processor to:
(a) determine a function of the signed distance values over corresponding regions for each object; and
(b) logically combine the function of signed distance values thus determined to classify the regions in a combination of the plurality of objects.

* * * * *